(12) United States Patent
Iriguchi et al.

(10) Patent No.: US 12,280,428 B2
(45) Date of Patent: Apr. 22, 2025

(54) ADDITIVE MANUFACTURING PATH GENERATION APPARATUS, ADDITIVE MANUFACTURING PATH GENERATION METHOD, AND MACHINE LEARNING APPARATUS

(71) Applicant: Mitsubishi Electric Corporation, Tokyo (JP)

(72) Inventors: Kenji Iriguchi, Tokyo (JP); Nobuhiro Shinohara, Tokyo (JP); Nobuyuki Sumi, Tokyo (JP); Shinji Fujishiro, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 428 days.

(21) Appl. No.: 17/909,757

(22) PCT Filed: Mar. 19, 2020

(86) PCT No.: PCT/JP2020/012501
§ 371 (c)(1),
(2) Date: Sep. 7, 2022

(87) PCT Pub. No.: WO2021/186723
PCT Pub. Date: Sep. 23, 2021

(65) Prior Publication Data
US 2023/0101500 A1 Mar. 30, 2023

(51) Int. Cl.
*B22F 10/85* (2021.01)
*B22F 12/90* (2021.01)
*B33Y 50/02* (2015.01)

(52) U.S. Cl.
CPC ............. *B22F 10/85* (2021.01); *B22F 12/90* (2021.01); *B33Y 50/02* (2014.12)

(58) Field of Classification Search
CPC .......... B22F 10/85; B22F 10/22; B22F 10/30; B22F 2999/00; B33Y 50/02; G06F 2113/10
See application file for complete search history.

(56) References Cited

U.S. PATENT DOCUMENTS 5,776,409 A * 7/1998 Almquist ............... B33Y 50/02
    118/712
11,106,192 B2  8/2021 Yang et al.
(Continued)

FOREIGN PATENT DOCUMENTS

CN    110430959 A   11/2019
CN    110695491 A    1/2020
(Continued)

OTHER PUBLICATIONS

International Search Report and Written Opinion mailed on Jun. 9, 2020, received for PCT Application PCT/JP2020/012501, filed on Mar. 19, 2020, 9 pages including English Translation.
(Continued)

*Primary Examiner* — Mong-Shune Chung
(74) *Attorney, Agent, or Firm* — XSENSUS LLP

(57) ABSTRACT

An additive manufacturing path generation apparatus includes: a formation path generation unit that divides an additive manufacturing object into layers that are units of formation of the additive manufacturing object such that a formation height of a bead that forms the layers does not exceed an upper limit and generates formation paths that are paths for formation of the divided layers from layer definition information and a formation path surface, the layer definition information defining division of the additive manufacturing object into the layers, the formation path surface being a surface restricting positions of the formation paths; and a formation path correction unit that corrects the formation paths to a formation path that causes a plurality of (Continued)

layers to be partially formed in a collective manner while maintaining the formation height within a range between the upper limit and a lower limit.

14 Claims, 18 Drawing Sheets

(56) References Cited

U.S. PATENT DOCUMENTS

| | | | |
|---|---|---|---|
| 2014/0048971 A1* | 2/2014 | Mannella | B33Y 30/00 264/129 |
| 2019/0007943 A1 | 1/2019 | Takeda et al. | |
| 2019/0143586 A1 | 5/2019 | Vilajosana et al. | |
| 2019/0381595 A1 | 12/2019 | Yamasaki et al. | |
| 2020/0079028 A1* | 3/2020 | Miller | B22F 10/47 |
| 2020/0081416 A1 | 3/2020 | Tsunoya et al. | |
| 2020/0247048 A1* | 8/2020 | Susnjara | G05B 19/4145 |
| 2022/0355407 A1* | 11/2022 | Fujii | B23K 9/04 |

FOREIGN PATENT DOCUMENTS

| | | |
|---|---|---|
| CN | 110696367 A | 1/2020 |
| CN | 110884113 A | 3/2020 |
| DE | 102018122293 A1 | 3/2019 |
| JP | 2000-15363 A | 1/2000 |
| JP | 2015-160217 A | 9/2015 |
| JP | 6472585 B1 | 2/2019 |
| JP | 2019-513596 A | 5/2019 |

OTHER PUBLICATIONS

Office Action mailed Sep. 16, 2023, in Chinese Application No. 202080098505.X, 19 pages.

German Office Action issued Oct. 11, 2024, in corresponding German Patent Application No. 11 2020 006 920.6, 18pp.

* cited by examiner

ADDITIVE MANUFACTURING PATH GENERATION APPARATUS, ADDITIVE MANUFACTURING PATH GENERATION METHOD, AND MACHINE LEARNING APPARATUS

CROSS-REFERENCE TO RELATED APPLICATION

The present application is based on PCT filing PCT/JP2020/012501, filed Mar. 19, 2020, the entire contents of which are incorporated herein by reference.

FIELD

The present disclosure relates to an additive manufacturing path generation apparatus, an additive manufacturing path generation method, and a machine learning apparatus for controlling an additive manufacturing apparatus that forms, or builds, an object by depositing layers of molten metal.

BACKGROUND

As a method for formation of an object by depositing layers of molten metal, there is known a method that includes a step of dividing an object to be formed into layered bodies along contour lines based on shape data on the shape of the object to be formed and a step of generating a movement path of a welding torch based on shape data on the obtained layered bodies, as disclosed in Patent Literature 1.

CITATION LIST

Patent Literature

Patent Literature 1: Japanese Patent Application Laid-open No. 2000-015363

SUMMARY

Technical Problem

However, with the conventional formation method described above, when an object is divided into layers along contour lines, the amount of displacement of a bead of an upper layer deposited on a bead of a lower layer may become large depending on the shape of the object to be formed; therefore, even if the amount of molten metal to be supplied is controlled, sagging in the direction of gravity may occur. The occurrence of sagging in the direction of gravity leads to a decrease in the accuracy of a formed object.

The present disclosure has been made in view of the above, and an object of the present disclosure is to obtain an additive manufacturing path generation apparatus capable of generating a formation path that can prevent sagging of molten metal.

Solution to Problem

In order to solve the above problem and achieve the object, the present disclosure includes: a formation path generation unit to divide an additive manufacturing object into layers that are units of formation of the additive manufacturing object such that a formation height of a bead that forms the layers does not exceed an upper limit and generate formation paths that are paths for formation of the divided layers from layer definition information and a formation path surface, the layer definition information defining division of the additive manufacturing object into the layers, the formation path surface being a surface restricting positions of the formation paths; and a formation path correction unit to correct the formation paths to a formation path that causes a plurality of layers to be partially formed in a collective manner while maintaining the formation height within a range between the upper limit and a lower limit.

Advantageous Effects of Invention

The present disclosure achieves the effect of being capable of obtaining an additive manufacturing path generation apparatus capable of generating a formation path that can prevent sagging of molten metal.

DESCRIPTION OF EMBODIMENTS

Hereinafter, an additive manufacturing path generation apparatus, an additive manufacturing path generation method, and a machine learning apparatus according to embodiments will be described in detail with reference to the drawings.

First, with reference to FIGS. 1 to 3, an example will be described in which, when an object to be formed, or to be built, which is an additive manufacturing object, is divided into layers along contour lines and additively manufactured, the amount of displacement of a bead of an upper layer deposited on a bead of a lower layer becomes large, and thus even if the amount of molten metal to be supplied is controlled, sagging in the direction of gravity occurs.

Figure 1:
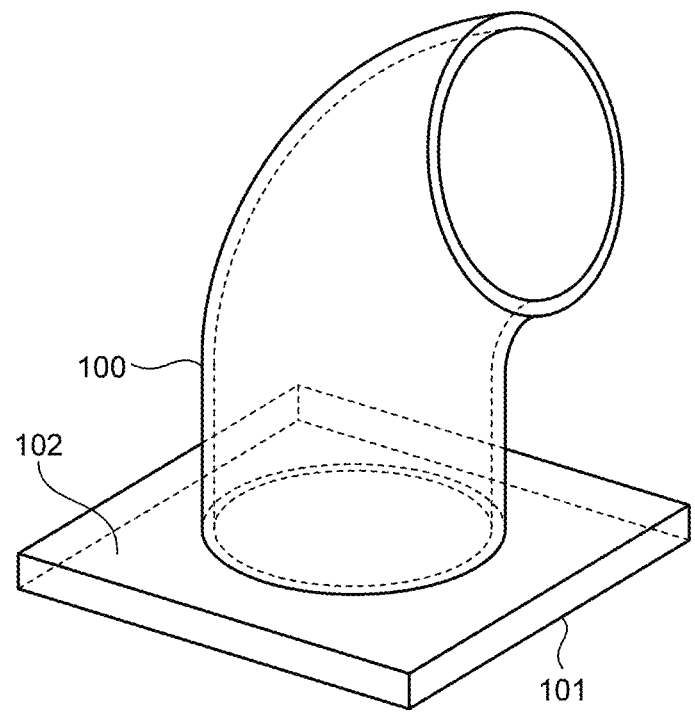
FIG. 1 is a diagram showing an example of an object to be formed by an additive manufacturing apparatus.

FIG. 1 is a diagram showing an example of an object to be formed by an additive manufacturing apparatus. FIG. 2 is a diagram showing an example in which the object to be formed illustrated in FIG. 1 is divided into layers along contour lines.

An object 100 to be formed is formed on a top surface 102 of a base 101. The object 100 to be formed has a bent cylindrical shape. The cylindrical wall surface is formed to be thin. FIG. 2 illustrates a state in which the object 100 to be formed is divided into layers along contour lines which are planes parallel to the top surface 102 of the base 101. Some of the adjacent upper and lower layers are greatly different in cross-sectional shape when viewed along formation directions, or build directions, indicated by arrows 103 in FIG. 2. For example, a first layer 100a and a second layer 100b are greatly different in cross-sectional shape. When the cross-sectional shape is greatly different between layers, it is difficult for a lower layer portion to support molten metal of an upper layer portion, and thus, sagging of the molten metal of the upper layer portion occurs.

Figure 3:
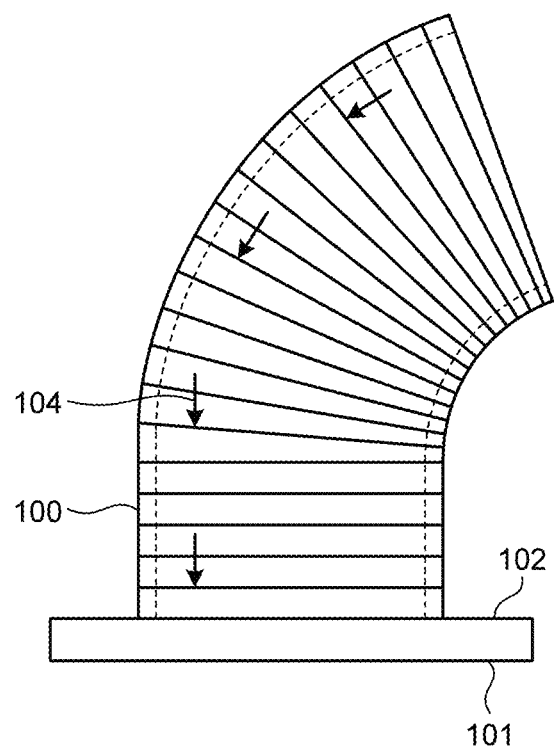
FIG. 3 is a diagram showing an example in which the object to be formed illustrated in FIG. 1 is divided into layers not along contour lines.

FIG. 3 is a diagram showing an example in which the object to be formed illustrated in FIG. 1 is divided into layers not along contour lines. As illustrated in FIG. 3, the object 100 to be formed is divided into layers such that the formation height of a bead is lower on an inner peripheral side of a bent portion. As a result, differences in the cross-sectional shape between layers viewed along formation directions indicated by arrows 104 in FIG. 3 are reduced. Therefore, it is possible to prevent occurrence of the sagging of molten metal.

However, in the example shown in FIG. 3, when a change in layer height increases in a single layer, object formation cannot be performed in some cases with a bead formation height within a range that allows efficient object formation while maintaining quality. In this case, there is a possibility of a deterioration in the quality of the object 100 to be formed, such as a decrease in the efficiency of object formation or a defect due to a failure of molten metal to be appropriately welded to the object 100 to be formed.

First Embodiment

Figure 4:
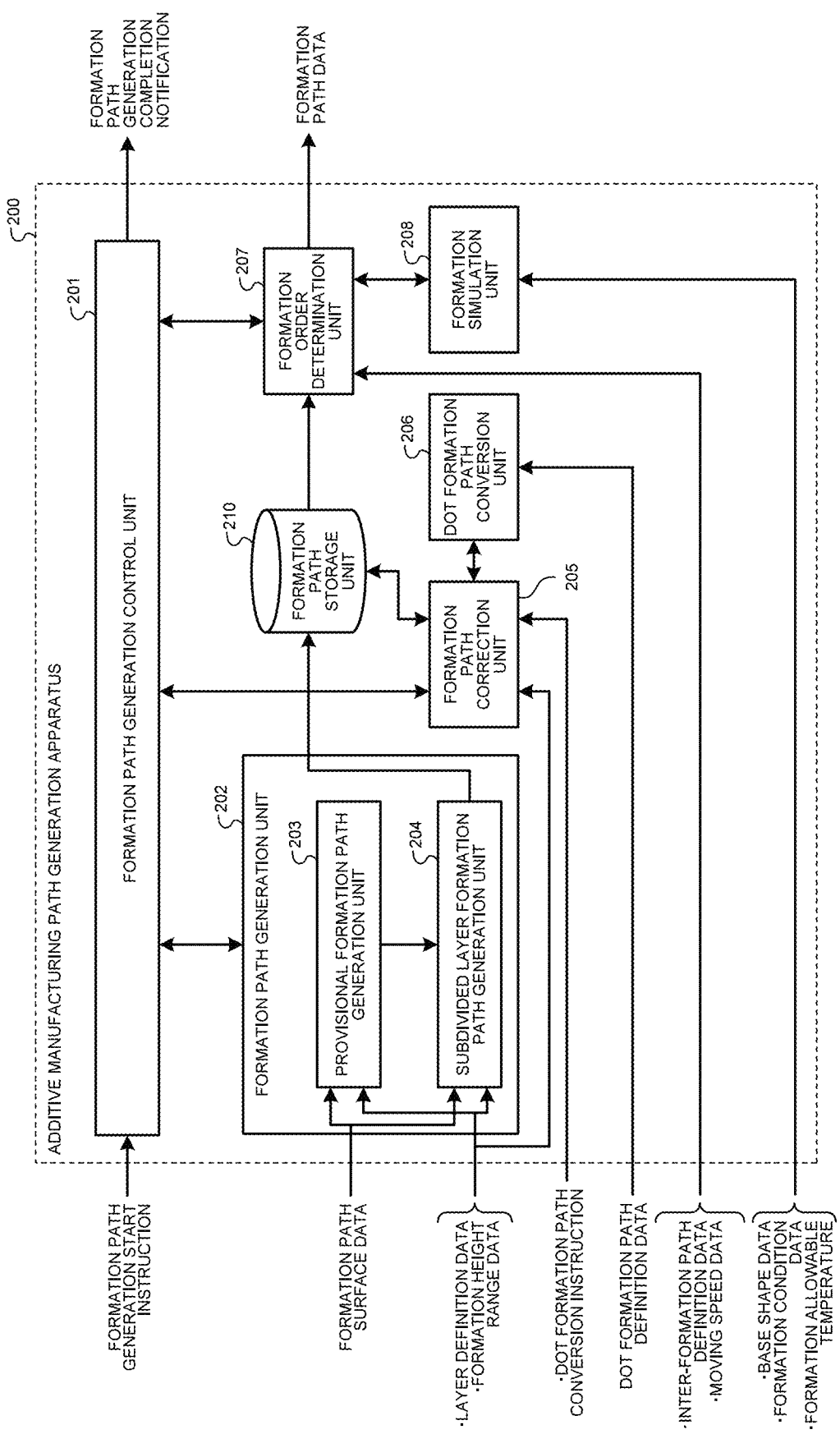
FIG. 4 is a block diagram illustrating a schematic configuration of an additive manufacturing path generation apparatus according to a first embodiment.

FIG. 4 is a block diagram illustrating a schematic configuration of an additive manufacturing path generation apparatus according to a first embodiment. An additive manufacturing path generation apparatus 200 includes a formation path generation control unit 201, a formation path generation unit 202, a formation path correction unit 205, a dot formation path conversion unit 206, a formation order determination unit 207, a formation simulation unit 208, and a formation path storage unit 210. First, operation of each functional unit of the additive manufacturing path generation apparatus 200 described above will be briefly described, and a detailed procedure will be described later with reference to a flowchart.

Upon receiving a formation path generation start instruction from an external device, the formation path generation control unit 201 controls the start of operation of each unit for generating a formation path. Specifically, the formation path generation control unit 201 sequentially transmits an operation start instruction to each of the formation path generation unit 202, the formation path correction unit 205, and the formation order determination unit 207. Here, the external device is exemplified by a higher-level device including the additive manufacturing path generation apparatus 200. Examples of the higher-level device include a CAM device and an automatic programming device on a formation machine.

Furthermore, the formation path generation control unit 201 determines that the entire operation for generating the formation path has been completed, based on the reception of notification of operation completion from each of the formation path generation unit 202, the formation path correction unit 205, and the formation order determination unit 207, and transmits formation path generation completion notification to the external device.

The formation path generation unit 202 includes a provisional formation path generation unit 203 and a subdivided layer formation path generation unit 204. Upon receiving an instruction to start operation from the formation path generation control unit 201, the formation path generation unit 202 causes the provisional formation path generation unit 203 and the subdivided layer formation path generation unit 204 to operate and generate formation path data. In addition, the formation path generation unit 202 stores the generated formation path data in the formation path storage unit 210, and transmits notification of operation completion to the formation path generation control unit 201.

Upon receiving an instruction to start operation from the formation path generation unit 202, the provisional formation path generation unit 203 acquires formation path surface data, layer definition data (layer definition information), and formation height range data from the external device. The provisional formation path generation unit 203 generates provisional formation path data based on the acquired formation path surface data, layer definition data, and formation height range data. The provisional formation path generation unit 203 transmits the generated formation path data to the subdivided layer formation path generation unit 204. The formation height range data include data indicating an upper limit of bead formation height and data indicating a lower limit of bead formation height. The layer definition data are data defining the division of an additive manufacturing object into layers that are units of formation of the additive manufacturing object.

Here, the formation path data to be generated in the present disclosure include data on each of a vertex position, a formation direction, and a bead formation height in the formation direction with respect to vertices of a polygonal line approximately representing an ideal formation path.

The subdivided layer formation path generation unit 204 acquires the formation path surface data, the layer definition data, and the formation height range data from the external device. Based on the formation path data transmitted from the provisional formation path generation unit 203, the formation path surface data, the layer definition data, and the formation height range data, the subdivided layer formation path generation unit 204 sets a subdivided layer such that a maximum formation height does not exceed the upper limit of the formation height range data in formation path data on one layer where the maximum formation height of the bead exceeds the upper limit of the formation height range data. The subdivided layer formation path generation unit 204 generates formation path data for the set subdivided layer. The subdivided layer formation path generation unit 204 sets a subdivided layer by updating data on formation height included in the formation path data transmitted from the provisional formation path generation unit 203. The subdivided layer formation path generation unit 204 stores, in the formation path storage unit 210, formation path data in which a subdivided layer has been set and formation path data generated for the subdivided layer.

Upon receiving an instruction to start operation from the formation path generation control unit 201, the formation path correction unit 205 acquires the formation path data stored in the formation path storage unit 210. Upon receiving an instruction to start operation from the formation path generation control unit 201, the formation path correction unit 205 acquires formation height range data from the external device. Upon receiving an instruction to start operation from the formation path generation control unit 201, the formation path correction unit 205 checks whether a dot formation path conversion instruction has been received from the external device.

When a dot formation path conversion instruction has been received from the external device, the formation path correction unit 205 transmits the formation path data to the dot formation path conversion unit 206, and causes the dot formation path conversion unit 206 to convert the data into dot formation path data for formation of a bead at discrete positions. The formation path correction unit 205 receives the dot formation path data from the dot formation path conversion unit 206.

The formation path correction unit 205 corrects the formation path data such that the formation height of the bead does not exceed the upper limit of the formation height range data and does not fall below the lower limit of the formation height range data to the extent possible. The formation path correction unit 205 updates data stored in the formation path storage unit 210 with the corrected formation path data, and transmits notification of operation completion to the formation path generation control unit 201.

The dot formation path conversion unit 206 converts the formation path data transmitted from the formation path correction unit 205 into dot formation path data for performing dot formation, based on the dot formation path definition data acquired from the external device. The dot formation path conversion unit 206 transmits the dot formation path data to the formation path correction unit 205.

Upon receiving an instruction to start operation from the formation path generation control unit 201, the formation order determination unit 207 determines the order of output of formation path data based on the formation path data stored in the formation path storage unit 210, inter-formation path definition data and moving speed data acquired from the external device, and a result of simulation in the formation simulation unit 208. The formation order determination unit 207 generates inter-formation movement path data between the formation path data to be output in the determined order, and formation standby time data. The formation order determination unit 207 outputs, to the external device, the formation path data to be output in the determined order, the inter-formation movement path data, and the formation standby time data. When the output of all the data is completed, notification of operation completion is transmitted to the formation path generation control unit 201. Note that the moving speed data are data indicating the moving speed of a unit that supplies metal material to be melted to form a bead. Note that, in the following description, the unit that supplies metal material to be melted to form a bead is referred to as a metal material supply unit.

The formation simulation unit 208 is a simulator that simulates the position of the metal material supply unit with respect to a formation object over time, a formation object shape, and a heat accumulation state that is the heat distribution of the formation object, based on base shape data and formation condition data acquired from the external device, and inter-formation movement path data and formation path data in which a moving speed has been specified. Note that the base shape data are data indicating the shape of the base 101. The formation object shape refers to a shape obtained by combination of the shape of the base 101 and a shape formed by the bead deposited in layers on the top surface 102.

The formation simulation unit 208 sets an initial state in accordance with an instruction from the formation order determination unit 207. When there is an inquiry from the formation order determination unit 207, the formation simulation unit 208 calculates a waiting time that is time that elapses before formation is started, based on inter-formation movement path data and formation path data provided and a formation allowable maximum temperature acquired from the external device. The formation simulation unit 208 transmits the calculated waiting time to the formation order determination unit 207. In response to an instruction from the formation order determination unit 207, the formation simulation unit 208 serves a function of causing the position of the metal material supply unit with respect to a formation object, the formation object shape on which a bead shape is placed, and the heat accumulation state of the formation object, which are based on the inter-formation movement path data and formation path data provided, to make a transition to simulated states.

The formation path storage unit 210 stores the formation path data generated by the subdivided layer formation path generation unit 204. When formation path data are corrected by the formation path correction unit 205, the formation path storage unit 210 updates the stored formation path data with the corrected formation path data.

Figure 5:
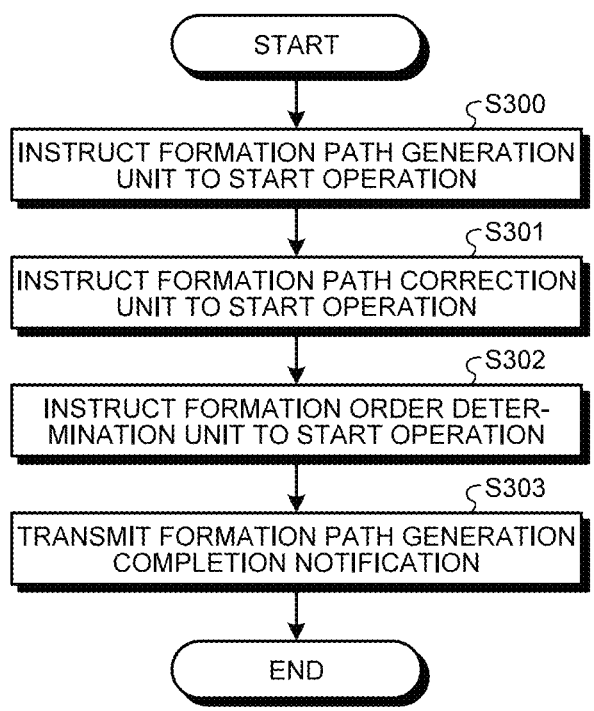
FIG. 5 is a flowchart illustrating operation to be performed when a formation path generation control unit receives an instruction to start formation path generation in the first embodiment.

Next, detailed operation of each functional unit of the additive manufacturing path generation apparatus 200 will be described with reference to a flowchart. FIG. 5 is a flowchart illustrating operation to be performed when the formation path generation control unit receives an instruction to start formation path generation in the first embodiment.

In step S300, the formation path generation control unit 201 transmits an operation start instruction to the formation path generation unit 202, and waits for reception of operation completion notification from the formation path generation unit 202. When the formation path generation control unit 201 receives operation completion notification from the formation path generation unit 202, the process proceeds to step S301.

In step S301, the formation path generation control unit 201 transmits an operation start instruction to the formation path correction unit 205, and waits for reception of operation completion notification from the formation path correction unit 205. When the formation path generation control unit 201 receives operation completion notification from the formation path correction unit 205, the process proceeds to step S302.

In step S302, the formation path generation control unit 201 transmits an operation start instruction to the formation order determination unit 207, and waits for reception of operation completion notification from the formation order determination unit 207. When the formation path generation control unit 201 receives operation completion notification from the formation order determination unit 207, the process proceeds to step S303.

In step S303, the formation path generation control unit 201 transmits notification of completion of formation path generation to the external device, and stops the operation.

Figure 6:
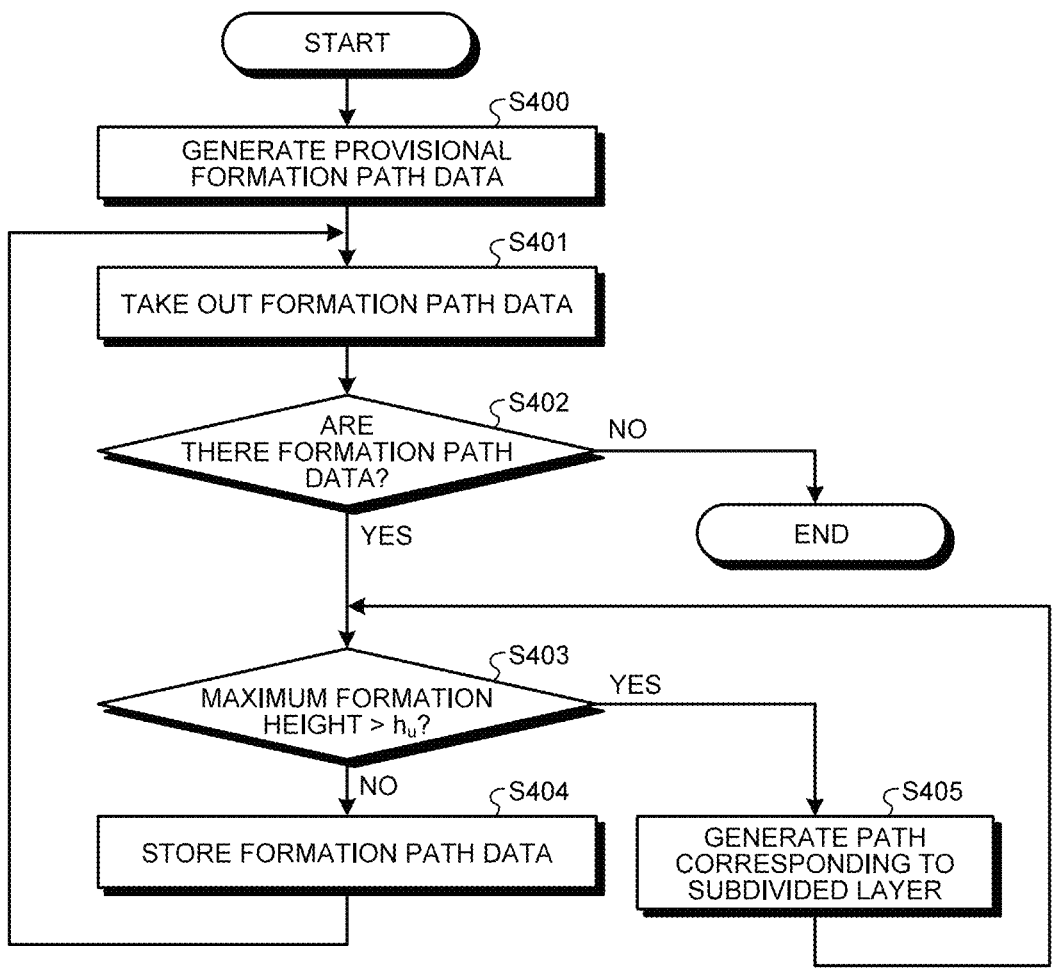
FIG. 6 is a flowchart illustrating operation to be performed when a formation path generation unit receives an instruction to start the operation in the first embodiment.

Next, a description will be given of operation to be performed when the formation path generation unit 202 receives an operation start instruction from the formation path generation control unit 201, that is, operation in step S300. FIG. 6 is a flowchart illustrating operation to be performed when the formation path generation unit receives an instruction to start the operation in the first embodiment.

In step S400, provisional formation path data are generated in the provisional formation path generation unit 203. The generated provisional formation path data are transmitted to the subdivided layer formation path generation unit 204.

Figure 7:
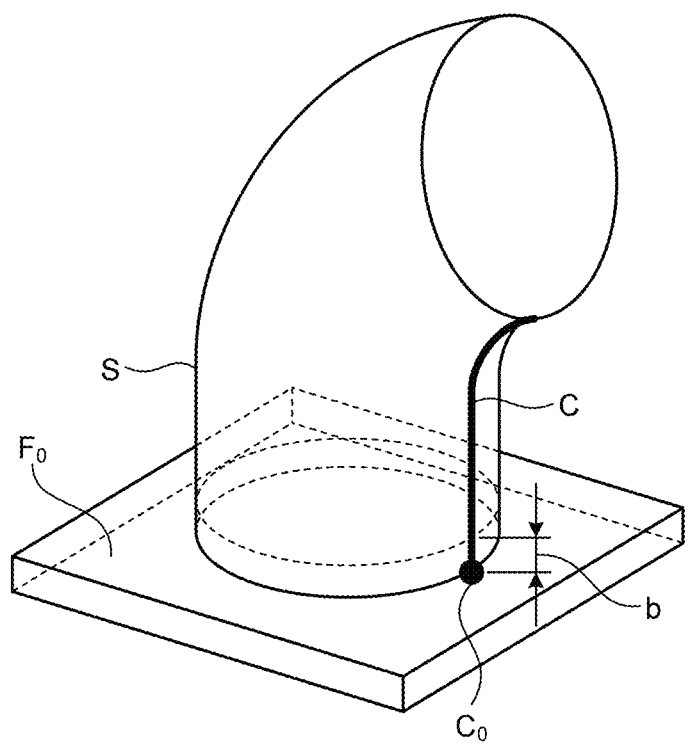
FIG. 7 is a diagram illustrating an image of input data to be input to a provisional formation path generation unit in the first embodiment.

An example of operation of the provisional formation path generation unit 203 will be described with reference to FIGS. 7 to 10. FIG. 7 is a diagram illustrating an image of input data to be input to the provisional formation path generation unit in the first embodiment. The positions of formation paths are restricted by a formation path surface S. Hereinafter, the following symbols are provided as information for defining layers: the symbol "$F_0$" denotes a plane serving as a reference surface, the symbol "C" denotes a curve for defining a layer having a non-uniform thickness in accordance with the shape, and the symbol "b" denotes a value for specifying a layer thickness along the curve C. The plane $F_0$ and the curve C intersect at a point $C_0$.

Figure 2:
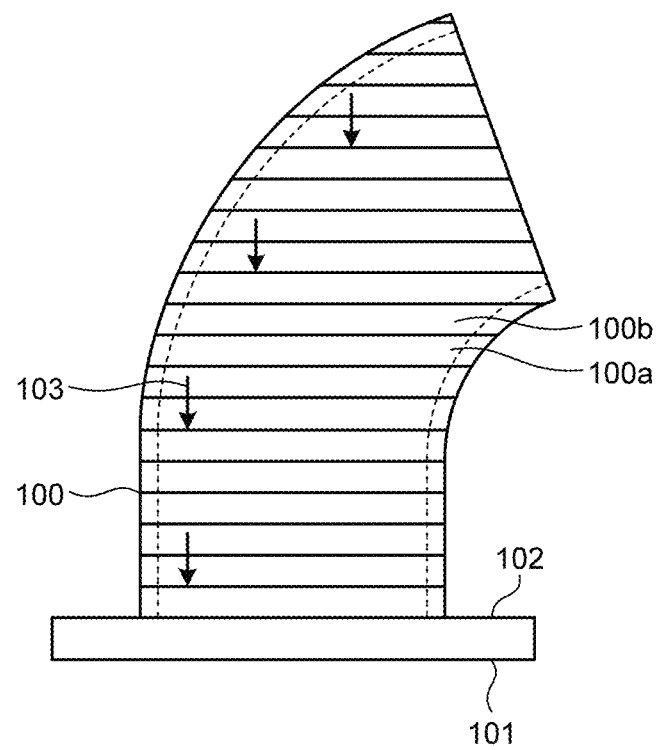
FIG. 2 is a diagram showing an example in which the object to be formed illustrated in FIG. 1 is divided into layers along contour lines.

The formation path surface S corresponds to the object 100 to be formed that is illustrated in FIGS. 1 to 3. Since the object 100 to be formed is formed with a thin wall surface, object formation is performed by use of a bead along a path of one line per layer. The neutral surface of the wall surface is regarded as the formation path surface. In order to perform object formation by arranging beads along a plurality of paths for one layer in a case where, for example, the object 100 to be formed is formed with a thick wall surface, it is possible to generate corresponding formation paths by providing a plurality of formation path surfaces for each bead.

Figure 8:
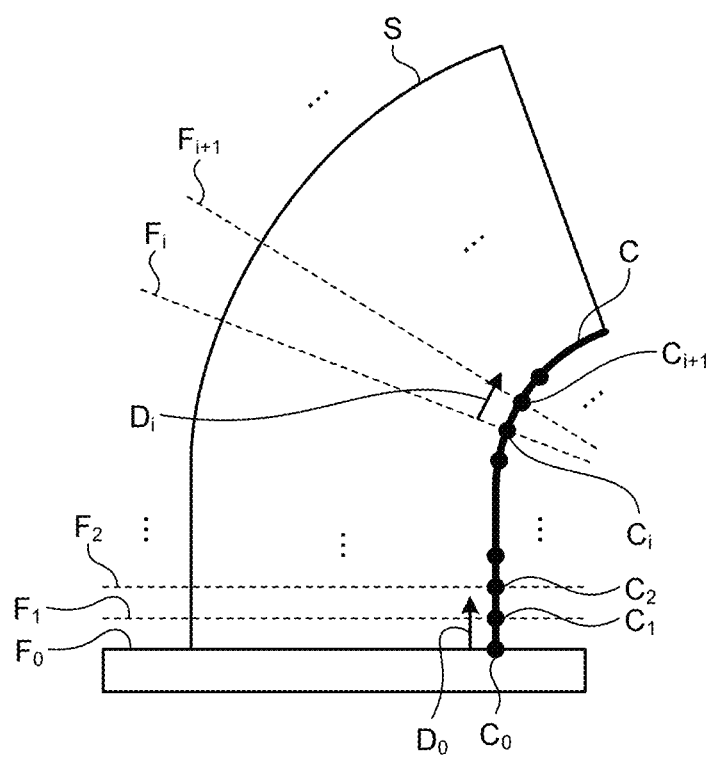
FIG. 8 is a diagram illustrating an image of defining boundary surfaces $F_1, F_2, \ldots$ between layers for defining the layers in the first embodiment.

FIG. 8 is a diagram illustrating an image of defining boundary surfaces $F_1, F_2, \ldots$ between layers for defining the layers in the first embodiment. A boundary surface $F_i$ between the i-th and (i+1)-th layers is defined as follows.

$C_i$: an i-th point located at a curve length distance of the value b from the point $C_0$ on the curve C $D_0$: a tangential direction vector of the curve C at the point $C_0$ ($|D_0|=1$)

$D_i$: a tangential direction vector of the curve C at a point $C_i$ ($|D_i|=1$)

The boundary surface $F_i$ is obtained by translation of the plane $F_0$ along a vector $C_i$-$C_0$ and rotation of the plane $F_0$ by a rotation angle of $\theta=\sin^{-1}(|D_0 \times D_i|)$ around a straight line passing through the point $C_i$ and extending in the direction of a vector $D_0 \times D_i$. Note that the symbol "x" denotes an outer product operation of vectors.

Figure 9:
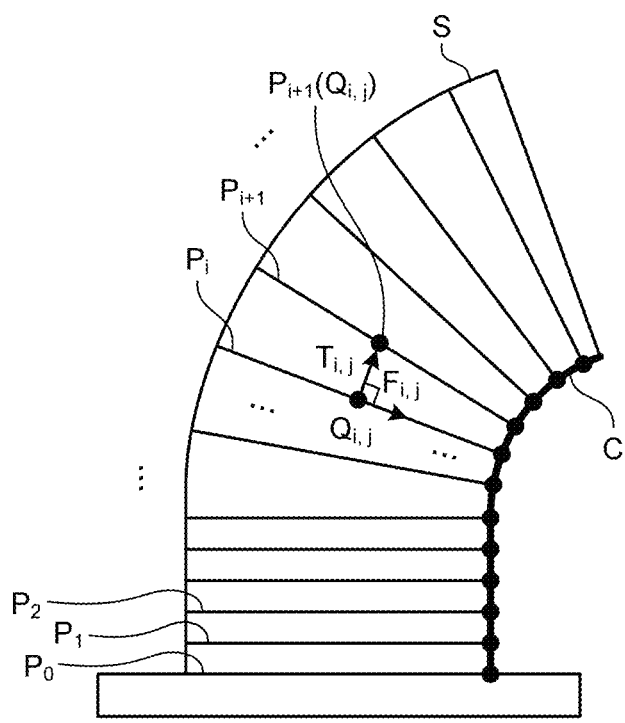
FIG. 9 is a diagram illustrating formation paths $P_0, P_1, \ldots$ to be generated in the first embodiment.

FIG. 9 is a diagram illustrating formation paths $P_0, P_1, \ldots$ to be generated in the first embodiment. A formation path $P_{i-1}$ of the i-th layer is obtained as an intersection line between the formation path surface S and a boundary surface $F_{i-1}$.

The formation path data in the present disclosure include data defining the position of a formation path and data defining a formation direction and a bead formation height in the formation direction with respect to a point on the formation path.

Figure 10:
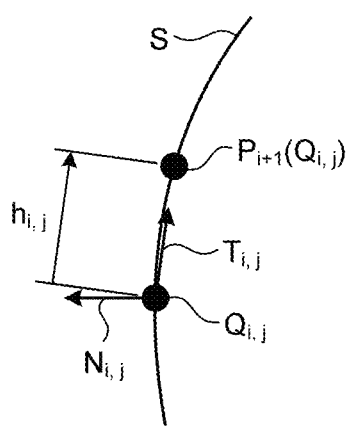
FIG. 10 is a diagram showing an example of defining a formation direction and a formation height with respect to a point $Q_{i,j}$ on a formation path in the first embodiment.

FIG. 10 is a diagram showing an example of defining a formation direction and a formation height with respect to a point $Q_{i,j}$ on a formation path in the first embodiment. The formation direction is defined as a direction $T_{i,j}$ from the point $Q_{i,j}$ toward a point $P_{i+1}(Q_{i,j})$ on a formation path of a layer one layer above on a cross-section including the point $Q_{i,j}$ and perpendicular to a tangential direction $F_{i,j}$ of a formation path at the point $Q_{i,j}$, and the formation height is defined as a distance between the point $Q_{i,j}$ and the point $P_{i+1}(Q_{i,j})$.

The information on the formation direction and the formation height is used for controlling the position of a formation object with respect to the build material supplying unit and controlling the amount of build material to be supplied and the moving speed of the build material supplying unit relative to the formation object in the additive manufacturing machine that performs object formation based on the formation path data in the present disclosure.

In step S401, the subdivided layer formation path generation unit 204 takes out formation path data transmitted from the provisional formation path generation unit 203 in order from the lowermost layer.

In step S402, it is checked whether there are any formation path data that have been taken out. When there are no formation path data (step S402, No), the operation of the subdivided layer formation path generation unit 204 is terminated, and the formation path generation unit 202 transmits operation completion notification to the formation path generation control unit 201. Meanwhile, when there are formation path data (step S402, Yes), the process proceeds to step S403.

In step S403, it is checked whether a maximum formation height in the formation path data that have been taken out exceeds an upper limit $h_u$ of a formation height range. When the maximum formation height does not exceed the upper limit $h_u$ of the formation height range (step S403, No), the process proceeds to step S404. Meanwhile, when the maximum formation height exceeds the upper limit $h_u$ of the formation height range (step S403, Yes), the process proceeds to step S405.

In step S404, the formation path data that have been taken out are stored in the formation path storage unit 210, and then the process returns to step S401.

In step S405, a subdivided layer of a layer to which the formation path data that have been taken out belong is set, and formation path data corresponding to the subdivided layer are generated. The formation path data corresponding to the subdivided layer are added, as formation path data yet to be taken out, to provisional formation path data. Thus, when the process returns to step S401, the formation path of the layer is taken out again to be compared with the upper limit $h_u$ of the formation height range again.

Figure 11:
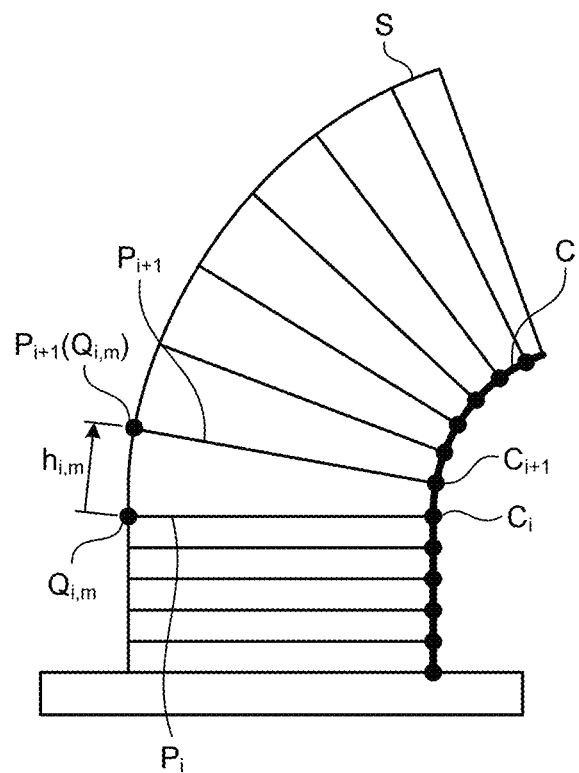
FIG. 11 is a diagram for describing the setting of a subdivided layer in the first embodiment.
Figure 12:
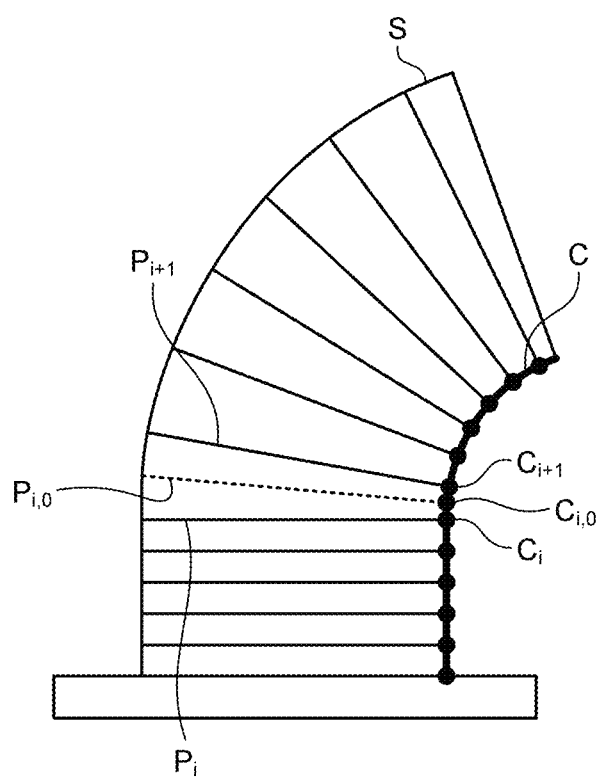
FIG. 12 is a diagram for describing the setting of a subdivided layer in the first embodiment.
Figure 13:
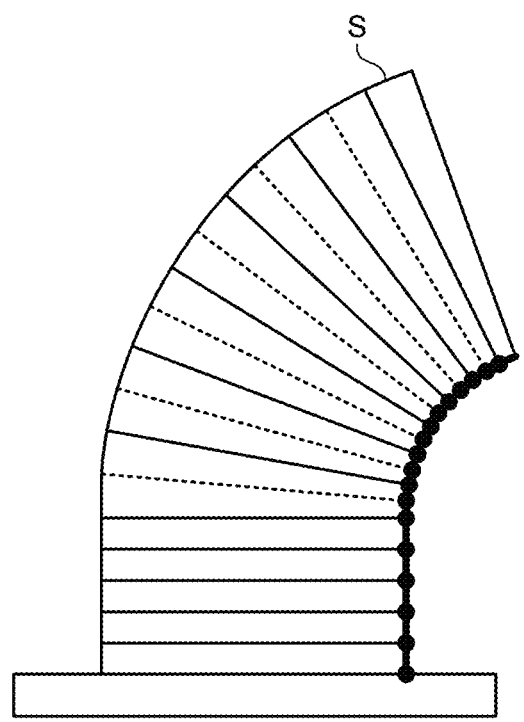
FIG. 13 is a diagram for describing the setting of a subdivided layer in the first embodiment.

The setting of a subdivided layer will be described with reference to FIGS. 11 to 13. FIGS. 11 to 13 are diagrams for describing the setting of a subdivided layer in the first embodiment. FIG. 11 is based on the assumption that the formation height of a formation path $P_i$ being taken out reaches a maximum value at a point $Q_{i,m}$ on the formation path, and this value exceeds the upper limit $h_u$ of the formation height range.

A layer to which the formation path $P_i$ belongs is interposed between boundary surfaces corresponding to the point $C_i$ and a point $C_{i+1}$ on the curve C for defining layers, and as illustrated in FIG. 12, a point $C_{i,0}$ on the curve C between the point $C_i$ and the point $C_{i+1}$ is taken and a boundary surface corresponding thereto is added. As a result, a subdivided layer is set.

Then, a formation path $P_{i,0}$ corresponding to the added boundary surface is generated. Data on the formation direction and the formation height are calculated in relation to a formation path $P_{i+1}$, and held in the formation path $P_{i,0}$. Furthermore, data on the formation direction and the formation height to be held in the formation path $P_i$ are calculated and updated in relation to the formation path $P_{i,0}$.

Thereafter, the processing returns to step S403, and the maximum formation height is checked again for the formation path $P_i$ for which formation height data have been updated.

A plurality of boundary surfaces may be used when a subdivided layer is set. It is possible to prevent an increase in the number of layers due to the setting of a subdivided layer, and reduce the formation path data and operation time, for example, by determining the number of boundary surfaces based on the ratio of the maximum formation height of the formation path $P_i$ to the upper limit $h_u$ of the formation height range.

FIG. 13 illustrates an image of formation path data stored in the formation path storage unit 210 after the operation of the subdivided layer formation path generation unit 204 is completed. In generation of the formation path data by use of the provisional formation path generation unit 203 and the subdivided layer formation path generation unit 204, it is possible to efficiently generate formation path data in which a maximum formation height does not exceed the upper limit $h_u$ of the formation height range by setting a subdivided layer in a necessary portion and adding formation path data.

As a method for generating a formation path such that the maximum formation height does not exceed the upper limit $h_u$ of the formation height range, it is also possible to adopt a method for determining the position of an (i+1)-th layer formation path in an exploratory manner such that the maximum formation height of an i-th layer formation path becomes equal to the upper limit $h_u$ of the formation height range in generation of initial formation path data. This method enables generation of formation path data in which the overall number of layers is further reduced.

Figure 14:
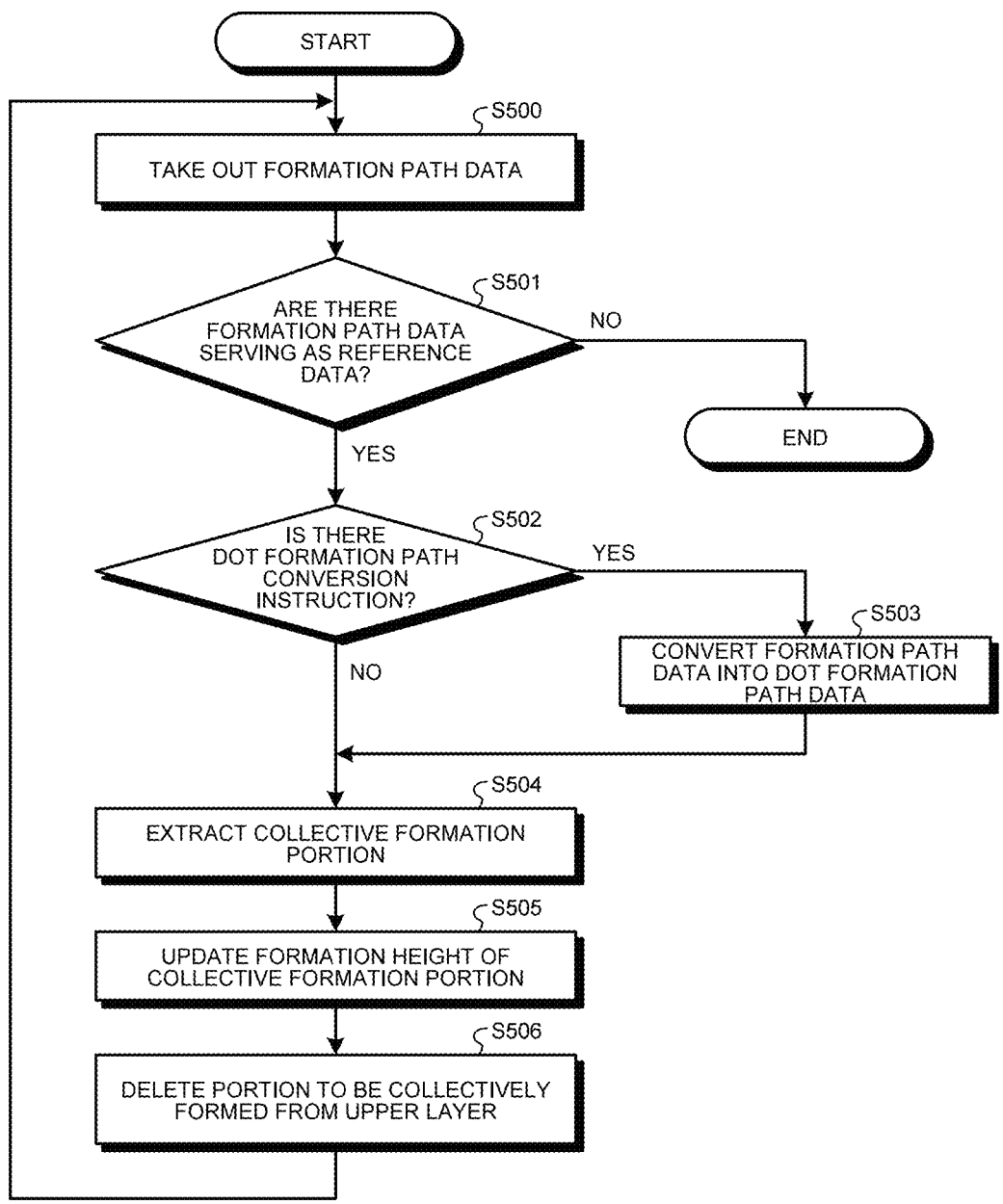
FIG. 14 is a flowchart illustrating operation to be performed when a formation path correction unit receives an instruction to start the operation in the first embodiment.
Figure 15:
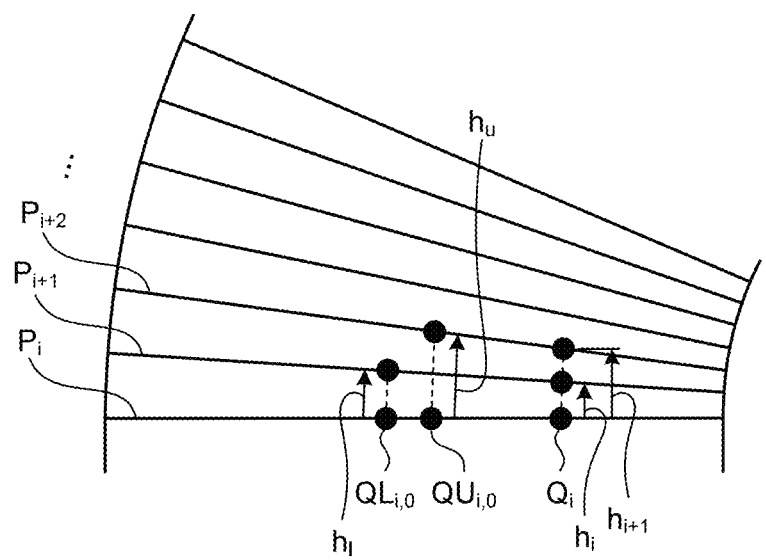
FIG. 15 is a diagram for describing extraction of a collective formation portion in the first embodiment.

Next, a description will be given of operation to be performed when the formation path correction unit 205 receives an operation start instruction from the formation path generation control unit 201, that is, operation in step S301. FIG. 14 is a flowchart illustrating operation to be performed when the formation path correction unit receives an instruction to start the operation in the first embodiment.

In step S500, formation path data serving as reference data are sequentially taken out from the formation path storage unit 210 in order from the lowermost layer toward upper layers.

In step S501, the presence or absence of formation path data serving as reference data is checked. When there are formation path data serving as reference data (step S501, Yes), the process proceeds to step S502. When there are no formation path data serving as reference data (step S501, No), operation completion notification is transmitted to the formation path generation control unit 201, and the operation ends.

In step S502, the presence or absence of a dot formation path conversion instruction from the external device is checked. When there is a dot formation path conversion instruction (step S502, Yes), the process proceeds to step S503. When there is no dot formation path conversion instruction (step S502, No), the process proceeds to step S504.

In step S503, the dot formation path conversion unit 206 converts the formation path data taken out as reference data into dot formation path data for performing dot formation in which a bead is formed at points that are discrete (discrete points). Here, the dot formation path conversion unit 206 determines an actual interval $d_a$ between formation points for each layer based on the formation path data from the formation path correction unit 205 and dot formation target interval data included in the dot formation path definition data acquired from the external device. The dot formation path conversion unit 206 generates points on a formation path indicated by the formation path data at actual intervals $d_a$, generates formation path data for dot formation based on positions of the generated points, and transmits the formation path data to the formation path correction unit 205.

In the determination of the actual interval $d_a$ between formation points, a path length L of a formation path indicated by formation path data is calculated for each layer, and a maximum integer value N is determined such that L/N does not exceed a formation target interval $d_t$, so that the actual interval $d_a$ is determined as follows: $d_a = L/N$.

In step S504, a collective formation portion is extracted from a formation path indicated by the reference formation path data. In the collective formation portion, object formation is collectively performed together with object formation based on a formation path of an upper layer. An example of extraction of the collective formation portion will be described with reference to FIGS. 15 to 22.

FIGS. 15 to 22 are diagrams for describing extraction of a collective formation portion in the first embodiment. Note that FIGS. 15 to 18 are diagrams for describing the case of object formation in units of lines, i.e. line formation.

In FIGS. 15 to 18, the formation path $P_i$ indicates a reference formation path. In the extraction of a collective formation portion, a portion where the formation height is lower than the lower limit $h_1$ of the formation height range in the reference formation path $P_i$ is first extracted as a collective formation candidate.

Figure 16:
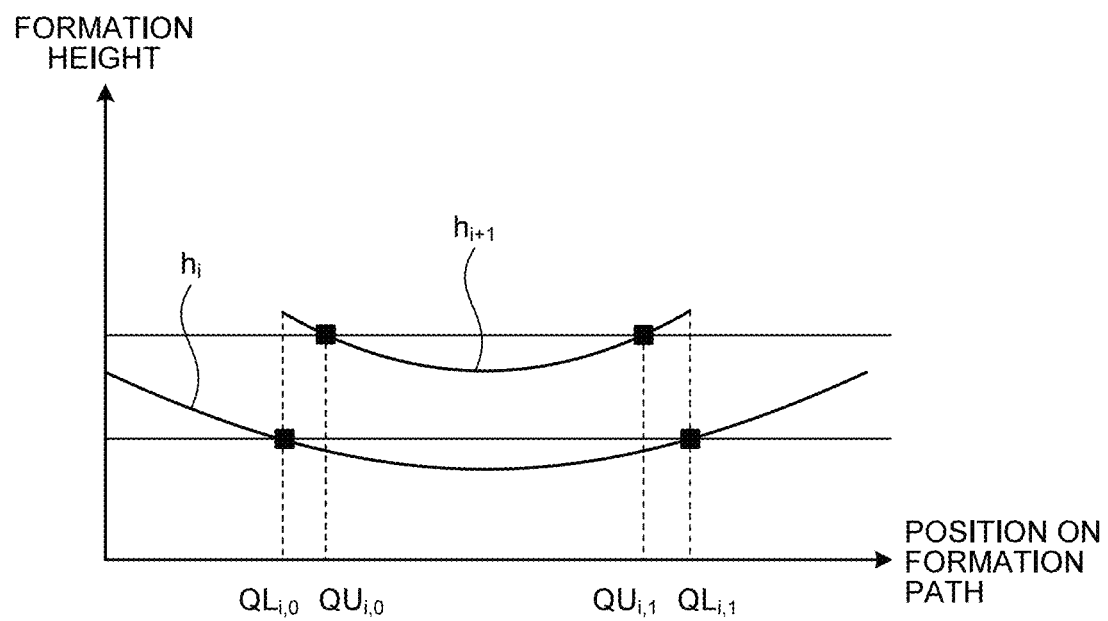
FIG. 16 is a diagram for describing extraction of a collective formation portion in the first embodiment.

FIG. 16 is a graph with the position of a point on the reference formation path $P_i$ on the horizontal axis and formation height for the point on the reference formation path $P_i$ on the vertical axis, where the symbol "$h_i$" denotes a formation height defined by the formation height data included in data on the formation path $P_i$. A portion between a point $QL_{i,0}$ and a point $QL_{i,1}$ is extracted as a portion where the formation height $h_i$ is below the lower limit $h_l$.

Then, a portion where object formation can be collectively performed together with object formation based on a formation path of an upper layer is next extracted from the extracted portion. In this extraction, a formation height is calculated which is required when object formation is collectively performed together with object formation based on a formation path of an upper layer, for the portion where the formation height $h_i$ of the reference formation path $P_i$ is below the lower limit $h_l$. Then, a portion where the calculated formation height is lower than the upper limit $h_u$ of the formation height range is extracted.

In FIG. 16, the symbol "$h_{i+1}$" denotes a calculated formation height that is needed when object formation is collectively performed on the reference formation path $P_i$ together with object formation based on the formation path $P_{i+1}$ of an upper layer. The formation height $h_{i+1}$ obtained by adding the formation height of the upper layer is below the upper limit $h_u$ of the formation height range, in a portion between a point $QU_{i,0}$ and a point $QU_{i,1}$, so that this portion is extracted as a collective formation portion.

Here, when the extracted portion includes a portion in which the formation height $h_{i+1}$ is lower than the lower limit $h_1$ of the formation height range, extraction of a collective formation portion where object formation is performed together with object formation based on a formation path of the next layer above is repeatedly performed for the portion in which the formation height $h_{i+1}$ is lower than the lower limit $h_l$. Note that, depending on the formation height range to be given, there exists a portion where the formation height is lower than the lower limit such as a section between the point $QL_{i,0}$ and the point $QU_{i,0}$ or a section between the point $QU_{i,1}$ and the point $QL_{i,1}$ of the formation path $P_i$ illustrated in FIG. 16, but such a portion does not exist in a portion where object formation can be collectively performed together with object formation based on a formation path of an upper layer, so that the portion where the formation height is lower than the lower limit is a section narrowed to the extent possible.

In step S505, the formation height data included in the formation path data are changed to data on a formation height necessary for collective formation, and original data in the formation path storage unit 210 are updated with the changed data, for the portion where object formation can be collectively performed together with object formation based on a formation path of an upper layer in the reference formation path extracted in step S504.

In step S506, formation path data on an upper layer including a portion to be collectively formed based on the reference formation path are changed to data from which a path corresponding to the portion to be collectively formed has been deleted, and the original data in the formation path storage unit 210 are updated with the changed data.

Figure 17:
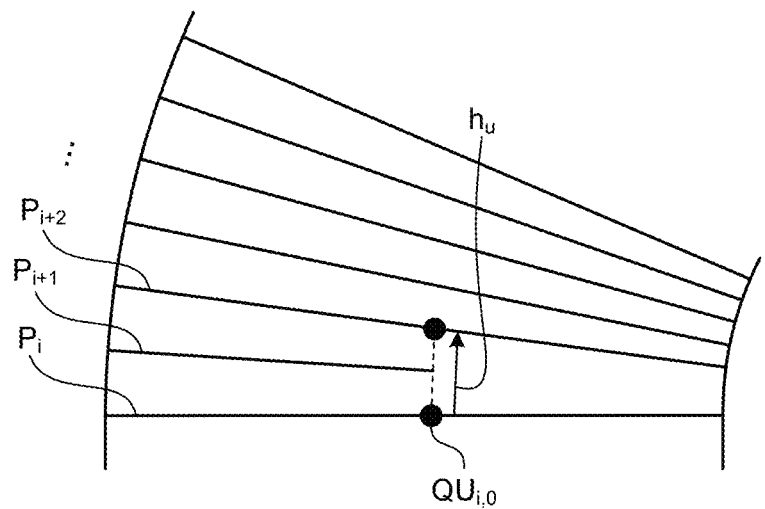
FIG. 17 is a diagram for describing extraction of a collective formation portion in the first embodiment.
Figure 18:
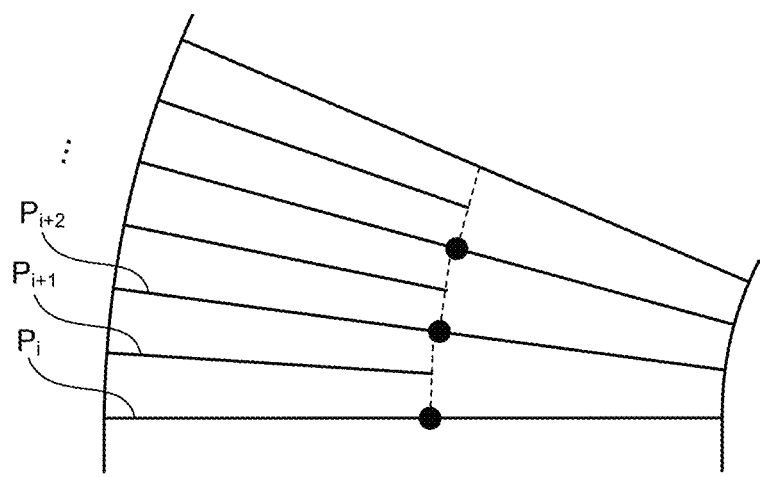
FIG. 18 is a diagram for describing extraction of a collective formation portion in the first embodiment.

FIG. 17 illustrates a result of updating the formation height data on the reference formation path $P_i$ and deleting a formation path corresponding to a portion to be collectively formed from the formation path $P_{i+1}$ of the upper layer including the portion to be collectively formed in object formation based on the reference formation path $P_i$. FIG. 18 illustrates a result of correcting formation paths by sequentially taking out reference formation paths in order from lower to upper layers.

Figure 19:
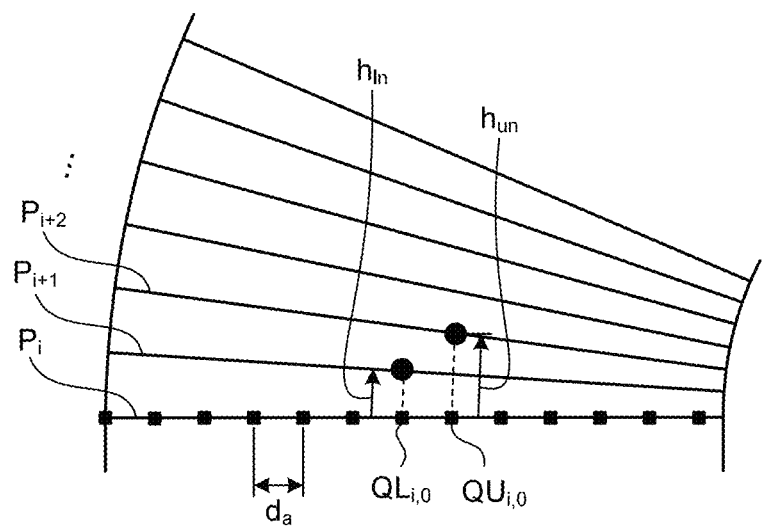
FIG. 19 is a diagram for describing extraction of a collective formation portion in the first embodiment.
Figure 20:
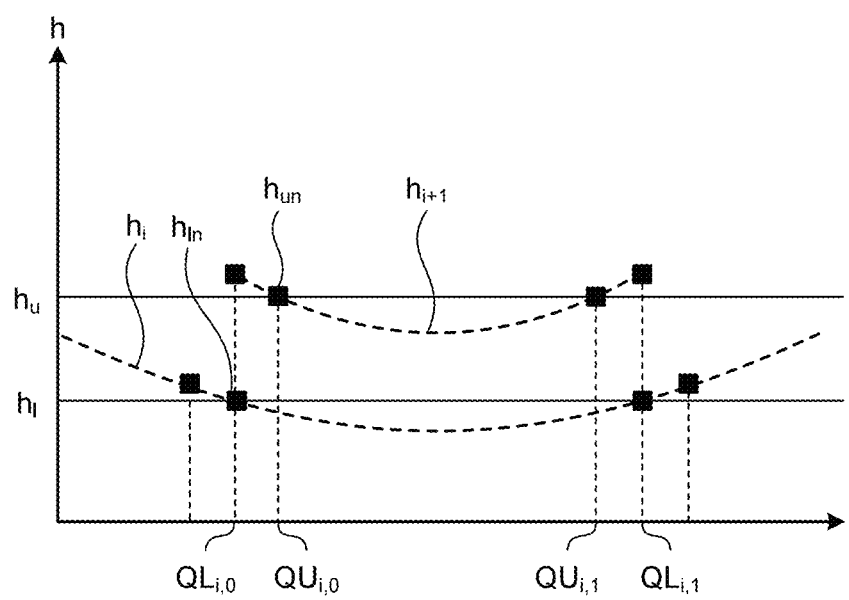
FIG. 20 is a diagram for describing extraction of a collective formation portion in the first embodiment.
Figure 21:
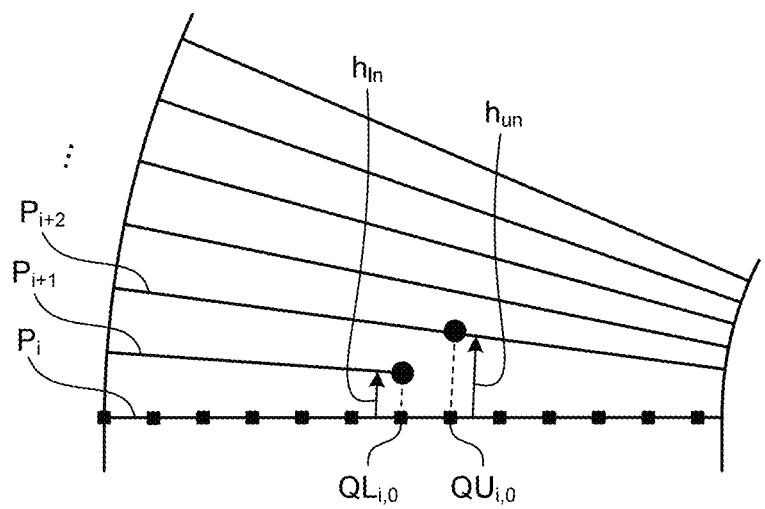
FIG. 21 is a diagram for describing extraction of a collective formation portion in the first embodiment.

FIGS. 19 to 22 are diagrams for describing the case of dot formation. FIG. 19 is based on the assumption that dot formation is performed at intervals of $d_a$ on the reference formation path $P_i$, and line formation is performed on a formation path of an upper layer as in the example above. Basically, in steps S504 to S506, processing is performed on the reference formation path as with the processing to be performed in a case of line formation. However, the collective formation portion to be extracted from the reference formation path in step S504 is extracted as a section between discrete points in dot formation as illustrated in FIG. 20. Furthermore, based on the extraction of a section between discrete points, the formation height data on the reference formation path are updated, and the path of the collective formation portion is deleted from a formation path of an upper layer including the portion to be collectively formed based on the reference formation path, as illustrated in FIG. 21.

Figure 22:
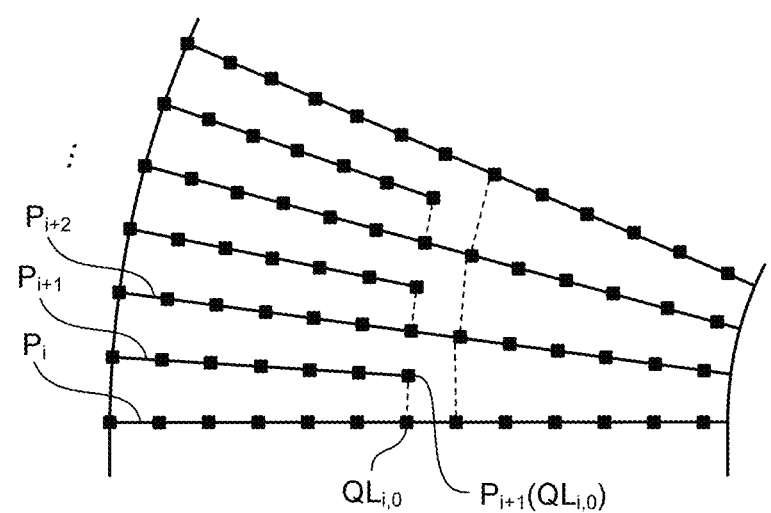
FIG. 22 is a diagram for describing extraction of a collective formation portion in the first embodiment.

When there is a dot formation path conversion instruction, it is possible to determine the position of an end point of object formation of each layer based on dot formation with good alignment such that the point $P_{i+1}(QL_{i,0})$ at the end of the (i+1)-th layer corresponds to the point $QL_{i,0}$ of the i-th layer in FIG. 22, by performing formation path correction while converting only object formation on the reference formation path into object formation based on dot formation. As a result, object formation can be performed with good quality.

Figure 23:
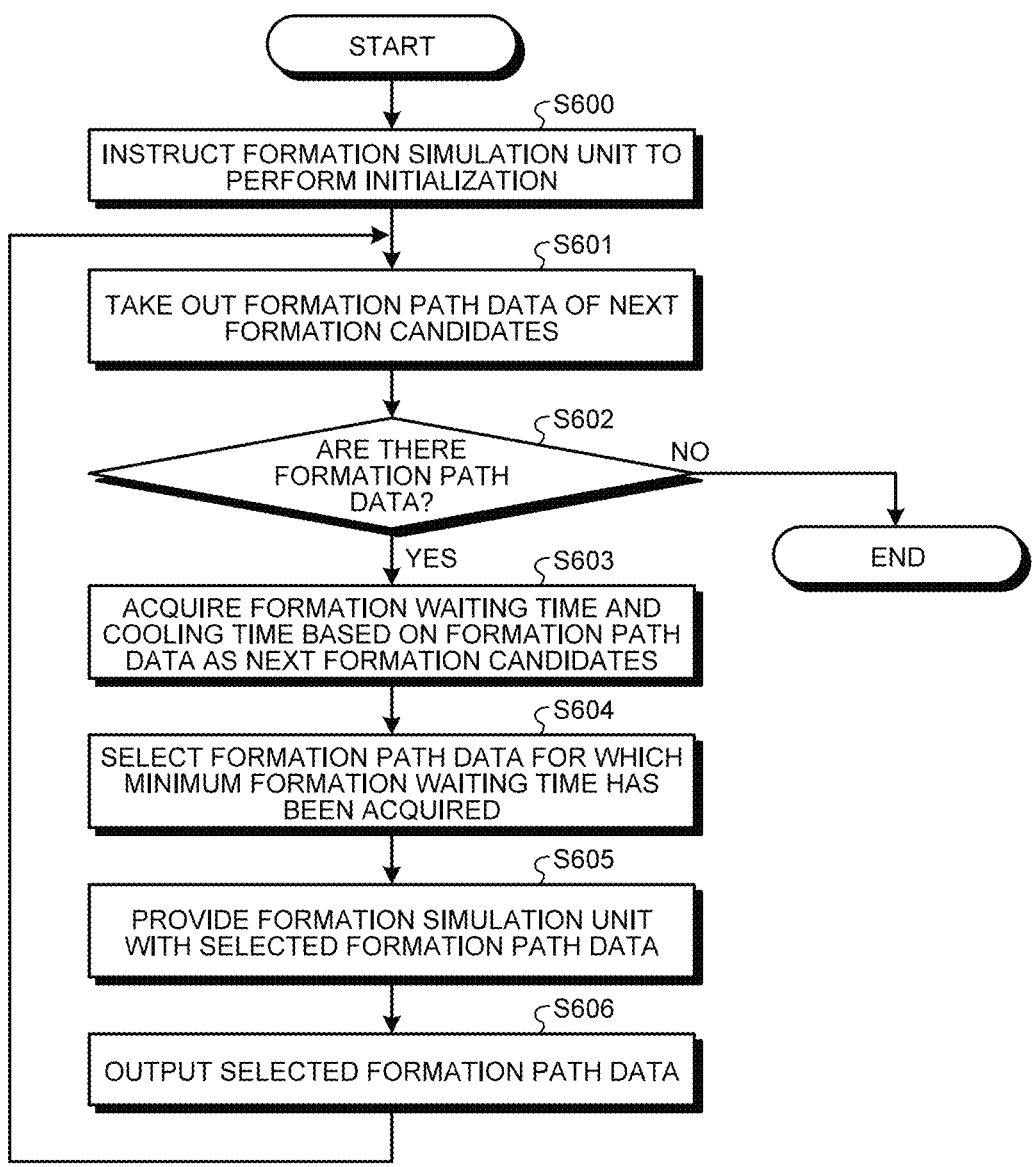
FIG. 23 is a flowchart illustrating operation to be performed when a formation order determination unit receives an instruction to start the operation in the first embodiment.

Next, a description will be given of operation to be performed when the formation order determination unit 207 receives an operation start instruction from the formation path generation control unit 201, that is, operation in step S302. FIG. 23 is a flowchart illustrating operation to be performed when the formation order determination unit receives an instruction to start the operation in the first embodiment.

In step S600, the formation order determination unit 207 instructs the formation simulation unit 208 to perform initialization. Upon receiving the instruction to perform initialization, the formation simulation unit 208 performs initialization such that the position of the formation machine, the formation object shape, and the heat distribution of the formation object in data representing a simulation state are restored to a state before the start of object formation, based on the base shape data and formation condition data acquired from the external device.

In step S601, the formation order determination unit 207 takes out a data group of formation path data of next formation candidates from the formation path storage unit 210. When formation path data are taken out, the formation path data are sequentially taken out in order from the lowermost layer toward upper layers, and formation path data within a range in which there is no upper and lower relationship between layers are taken out as data for the next formation candidates from the formation paths that have been taken out.

In step S602, the formation order determination unit 207 checks the presence or absence of formation path data of next formation candidates. When there are no formation path data of next formation candidates (step S602, No), operation completion notification is transmitted to the formation path generation control unit 201, and the operation of the formation order determination unit 207 is ended. When there are formation path data of next formation candidates (step S602, Yes), the process proceeds to step S603.

In step S603, the formation order determination unit 207 generates, for each piece of formation path data of next formation candidates, movement path data on a movement path from the end point of a formation path for which a formation state has been most recently reflected in the formation simulation unit 208 to the starting point of a formation path of the next formation candidate. The formation order determination unit 207 provides the formation simulation unit 208 with the formation path data of the next formation candidates and the movement path data on the movement paths to the starting points of the formation paths, and acquires formation waiting time and cooling time from the formation simulation unit 208. The formation waiting time is a waiting time that elapses before the start of object formation based on a formation path of a next formation candidate. The cooling time is time required for the cooling of the formation object during the waiting time.

Figure 24:
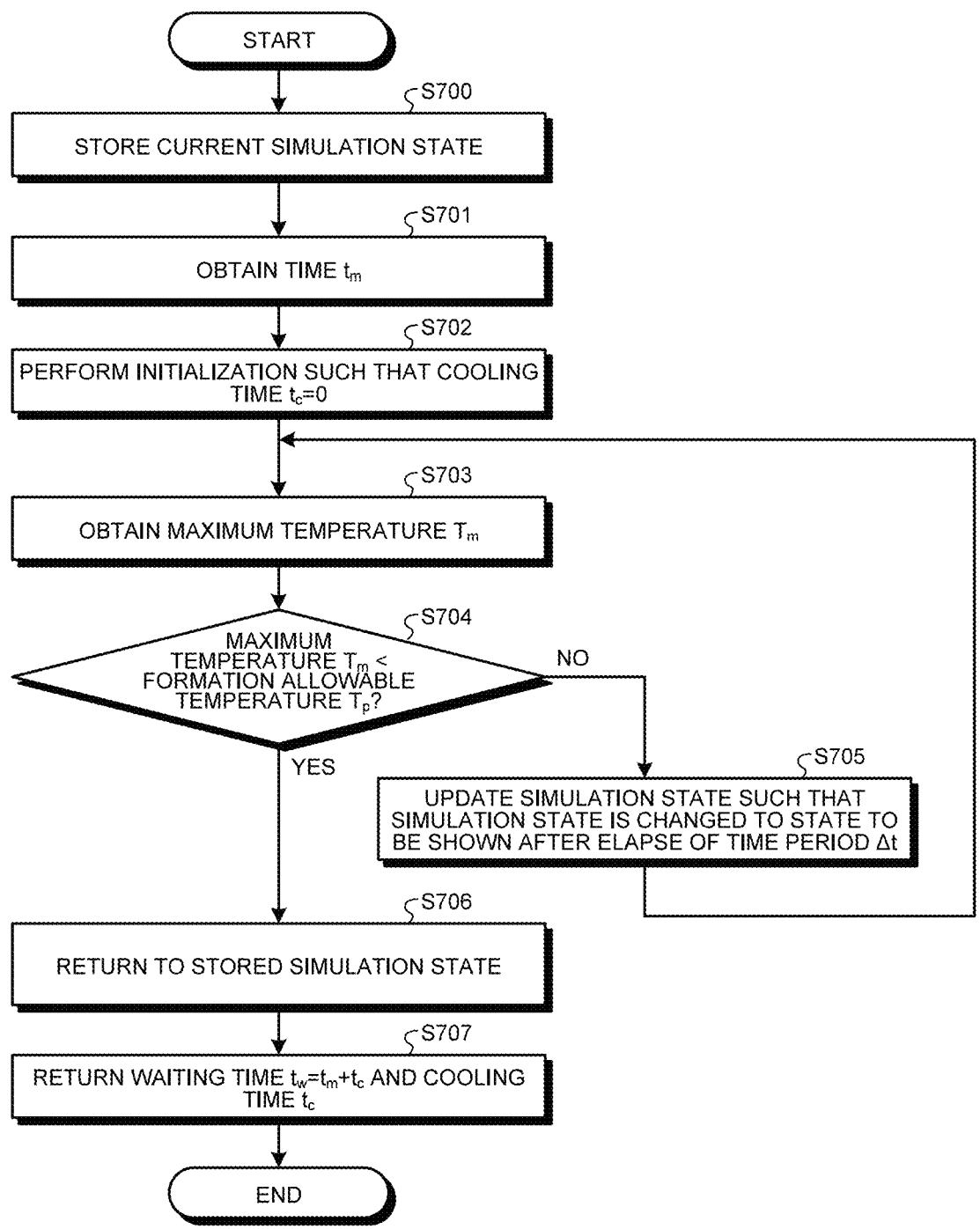
FIG. 24 is a flowchart illustrating operation of a formation simulation unit to which formation path data and the like have been provided from the formation order determination unit in the first embodiment.

Here, a description will be given of operation to be performed by the formation simulation unit 208 for calculating the waiting time and the cooling time, that is, operation to be performed by the formation simulation unit 208 when the formation path data and the like are provided from the formation order determination unit 207 in step S603. FIG. 24 is a flowchart illustrating operation of the formation simulation unit to which formation path data and the like have been provided from the formation order determination unit in the first embodiment.

In step S700, the formation simulation unit 208 stores therein data for returning to the current simulation state later. In step S701, based on the movement path data provided from the formation order determination unit 207 and the moving speed data acquired from the external device, the formation simulation unit 208 reflects the state of movement on a movement path in simulation, and obtains time $t_m$. Here, the time $t_m$ is time required for the metal material supply unit to move from the end point of the formation path for which the formation state has been most recently reflected to the starting point of a formation path on the next formation candidate along the provided movement path.

In step S702, the formation simulation unit 208 initializes cooling time $t_c$ to 0. In step S703, the formation simulation unit 208 obtains a maximum temperature $T_m$ in the simulation state of a portion corresponding to a formation object shape on which a bead is placed based on the formation path, on the basis of the formation path data provided from the formation order determination unit 207 and the formation condition data acquired from the external device.

In step S704, the formation simulation unit 208 checks whether the obtained maximum temperature $T_m$ is lower than a formation allowable temperature $T_p$ acquired from the external device. When the maximum temperature $T_m$ is lower than the formation allowable temperature $T_p$ (step S704, Yes), the process proceeds to step S706. When the maximum temperature $T_m$ is equal to or higher than the formation allowable temperature $T_p$ (step S704, No), the process proceeds to step S705.

In step S705, the formation simulation unit 208 updates the simulation state such that the simulation state is changed to a state to be shown after the elapse of a very short time period $\Delta t$, and increases the cooling time $t_c$ by the very short time period $\Delta t$. Then, the process proceeds to step S703. In step S706, the state returns to the simulation state stored in step S700.

In step S707, the formation simulation unit 208 returns waiting time $t_w$ and the cooling time $t_c$ to the formation order determination unit 207, and then ends the operation of waiting time calculation. The waiting time $t_w$ is calculated as the sum of the movement time $t_m$ and the cooling time $t_c$. The above is the operation to be performed by the formation simulation unit 208 for calculating the waiting time and the cooling time.

Returning to FIG. 23, in step S604, a piece of formation path data for which a minimum formation waiting time has been acquired is selected from among pieces of formation path data of next formation candidates. In step S605, the selected piece of formation path data is provided to the formation simulation unit 208, so as to cause a simulation state to change to a state to be shown after object formation is performed based on the provided data.

In step S606, the formation order determination unit 207 outputs, to the external device, the movement path data generated in step S603 to which the cooling time data acquired in step S603 have been added with respect to the selected piece of formation path data, together with the selected piece of formation path data. Thereafter, the process returns to step S601. The above is operation of the formation order determination unit 207.

According to the additive manufacturing path generation apparatus 200 described above, it is possible to generate a formation path such that the formation height does not exceed a specified upper limit and does not fall below a predetermined lower limit to the extent possible in object formation in which layers that are not uniform in height are deposited. As a result, object formation can be performed with an appropriate formation height based on an output formation path, so that deterioration in formation efficiency and quality can be prevented.

Furthermore, the additive manufacturing path generation apparatus 200 determines the order in which formation path data are output in such a way as to minimize waiting time that elapses before the start of object formation, based on time required to move between formation paths and cooling time required for the temperature of a part of the formation object on which the bead is placed based on the formation path to decrease to a specified temperature. Then, the additive manufacturing path generation apparatus 200 outputs movement path data to which cooling time data have been added, between formation path data. As a result of performing object formation based on the output data, it is possible to reduce object formation time while preventing a formation object from losing its shape, by maintaining the temperature of a portion of the formation object where the bead is placed at or below the specified temperature.

Figure 25:
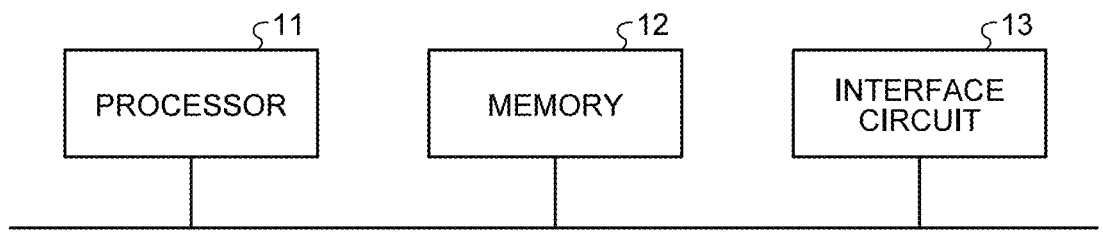
FIG. 25 is a diagram showing an example of hardware that implements the additive manufacturing path generation apparatus according to the first embodiment.

FIG. 25 is a diagram showing an example of hardware that implements the additive manufacturing path generation apparatus according to the first embodiment. A processor 11 is a central processing unit (CPU, also referred to as a processing device, an arithmetic device, a microprocessor, a microcomputer, or a digital signal processor (DSP)), a system large-scale integration (LSI), or the like. Examples of a memory 12 include a random access memory (RAM), a read only memory (ROM), an erasable programmable read only memory (EPROM), an electrically erasable programmable read only memory (EEPROM) (registered trademark), and a hard disk drive. An interface circuit 13 is a circuit that allows the additive manufacturing path generation apparatus 200 to exchange data with the external device.

The formation path generation control unit 201, the formation path generation unit 202, the provisional formation path generation unit 203, the subdivided layer formation path generation unit 204, the formation path correction unit 205, the dot formation path conversion unit 206, the formation order determination unit 207, and the formation simulation unit 208 of the additive manufacturing path generation apparatus 200 are implemented by the processor 11 executing programs for causing these units to operate.

The programs are stored in the memory 12 in advance. The processor 11 reads the programs described above from the memory 12, and executes the programs. Note that it is assumed that the programs are stored in the memory 12 in advance, but the present disclosure is not limited thereto. The programs may be written in a recording medium such as a compact disc (CD)-ROM or a digital versatile disc (DVD)-ROM and supplied to a user such that the user installs the programs described above in the memory 12. In this case, the hardware that implements the additive manufacturing path generation apparatus 200 further includes a reading device for reading the programs from the recording medium. Alternatively, the reading device may be connected to the interface circuit 13 to install the programs.

Second Embodiment

Figure 26:
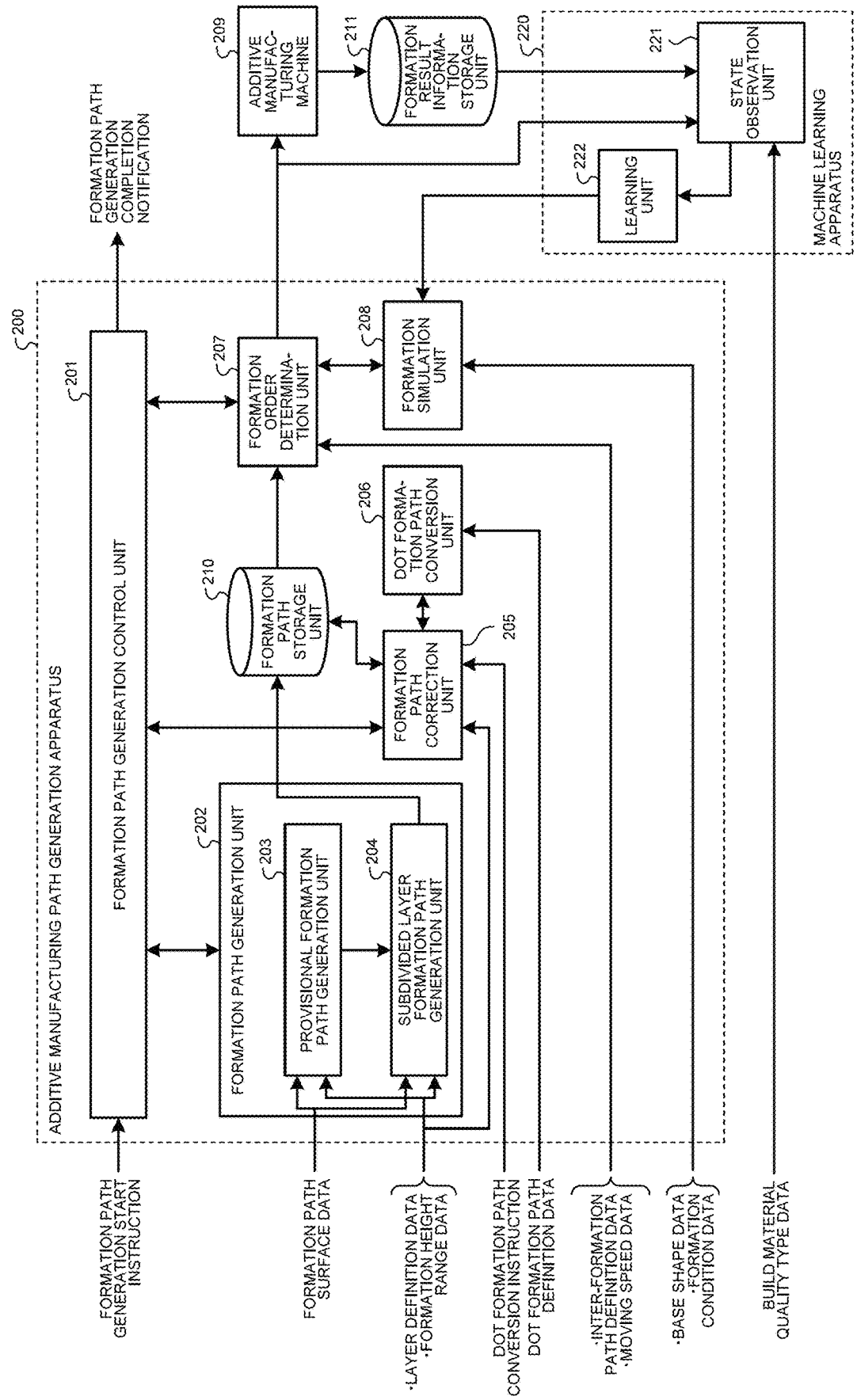
FIG. 26 is a block diagram illustrating a configuration of a machine learning apparatus according to a second embodiment.

Hereinafter, a machine learning apparatus according to a second embodiment will be described in detail with reference to the drawing. Note that the same constituent elements as those in the first embodiment described above are denoted by the same reference numerals, and detailed description thereof is omitted. FIG. 26 is a block diagram illustrating a configuration of the machine learning apparatus according to the second embodiment. A machine learning apparatus 220 includes a state observation unit 221 and a learning unit 222.

The state observation unit 221 observes, as state variables, formation path data output by the additive manufacturing path generation apparatus 200, build material quality type data, and the formation accuracy of a result of object formation based on the formation path data output by the additive manufacturing path generation apparatus 200.

For example, it is desirable to use, as the formation accuracy of a result of object formation based on the formation path data, a value measured by use of a device such as a three-dimensional measuring machine, a surface roughness tester, or an image dimension measuring instrument. Information on the formation accuracy may be stored in, for example, a formation result information storage unit 211.

The learning unit 222 learns a formation allowable temperature that satisfies the formation accuracy of the result of object formation based on the formation path data, according to a data set created based on the state variables of the formation path data, the build material quality type data, and the formation accuracy of the result of object formation based on the formation path data.

The formation allowable temperature specifies a maximum temperature required for a portion corresponding to a formation object shape on which a bead is placed based on a formation path when the formation simulation unit 208 calculates cooling time that is a component of formation waiting time for the formation path serving as a base in determination of formation order regarding formation paths in the additive manufacturing path generation apparatus 200.

The learning unit 222 may use any learning algorithm. A case where reinforcement learning is applied will be described as an example. In reinforcement learning, an agent (action subject) in a certain environment observes a current state, and determines an action to be taken. The agent obtains a reward from the environment by selecting an action, and learns a measure that maximizes the reward through a series of actions. Q-learning and TD-learning are known as representative methods for reinforcement learning. For example, in the case of Q-learning, a general update formula (action value table) of an action value function Q(s,a) is expressed by formula (1) below.

$$Q(s_t, a_t) \leftarrow Q(s_t, a_t) + \alpha\left(r_{t+1} + \gamma \max_a Q(s_{t+1}, a) - Q(s_t, a_t)\right)$$ [Formula 1]

In formula (1), the symbol "$s_t$" represents an environment at time t, and the symbol "$a_t$" represents an action at time t. As a result of the action $a_t$, the environment changes to $s_{t+1}$. The symbol "$r_{t+1}$" represents a reward to be given according to a change in the environment, the symbol "$\gamma$" represents a discount rate, and the symbol "$\alpha$" represents a learning coefficient. Note that $\gamma$ is in a range of $0<\gamma\leq1$, and $\alpha$ is in a range of $0<\alpha\leq1$. When Q-learning is applied, the formation allowable temperature to be input corresponds to the action $a_t$.

The update formula represented by formula (1) increases an action value Q when the action value of the best action "a" at time t+1 is larger than the action value Q of the action "a" taken at time t, and decreases the action value Q in the opposite case. In other words, the action value function Q(s,a) is updated such that the action value Q of the action "a" at time "t" approaches the best action value at time "t+1". As a result, the best action value in a certain environment is sequentially propagated to action values in the previous environments.

The learning unit 222 includes a reward calculation unit and a function update unit. The reward calculation unit calculates a reward on the basis of state variables. The reward calculation unit calculates a reward "r" on the basis of the processing accuracy of the result of formation based on the formation path data output from the additive manufacturing path generation apparatus 200. For example, when the formation accuracy of the result of object formation based on the formation path data is better than desired formation accuracy, the reward "r" is increased (for example, a reward of "1" is given.). Meanwhile, when the formation accuracy of the result of object formation based on the formation path data is worse than the desired formation accuracy, the reward "r" is reduced (for example, a reward of "−1" is given.).

The formation accuracy of the result of object formation based on the formation path data is extracted according to a known method. For example, the reward r is determined based on determination as to whether a value measured by use of a device such as a three-dimensional measuring machine, a surface roughness tester, or an image dimension measuring instrument is within a range of desired formation accuracy.

The function update unit updates a function for determining a formation allowable temperature that satisfies the formation accuracy of the result of object formation based on the formation path data, according to the reward calculated by the reward calculation unit. For example, in the case of Q-learning, an action value function $Q(s_t, a_t)$ represented by formula (1) is used as a function for calculating the formation allowable temperature that satisfies the formation accuracy of the result of object formation based on the formation path data.

Note that the case where reinforcement learning is applied as a learning algorithm to be used by the learning unit 222 has been described in the present embodiment, but the learning algorithm is not limited thereto. Not only reinforcement learning, but also supervised learning, unsupervised learning, semi-supervised learning, or the like can be applied as the learning algorithm.

Furthermore, deep learning, in which extraction of a feature amount itself is learned, can be used as the above-described learning algorithm. Alternatively, machine learning may be performed according to another known method such as a neural network, genetic programming, function logic programming, or a support vector machine.

Note that the machine learning apparatus 220, which is used to learn a formation allowable temperature that satisfies the formation accuracy of the result of object formation based on the formation path data output by the additive manufacturing path generation apparatus 200, may be, for example, a device connected to the additive manufacturing path generation apparatus 200 via a network and provided separately from the additive manufacturing path generation apparatus 200. In addition, the machine learning apparatus 220 may be built into the additive manufacturing path generation apparatus 200. Moreover, the machine learning apparatus 220 may be located on a cloud server.

Furthermore, the learning unit 222 may learn a formation allowable temperature that satisfies the formation accuracy of the result of object formation based on the formation path data, according to a data set created for a plurality of the additive manufacturing path generation apparatuses 200. Note that the learning unit 222 may acquire data sets from a plurality of the additive manufacturing path generation apparatuses 200 to be used on the same site, or may learn a formation allowable temperature that satisfies the formation accuracy of the result of processing based on the formation path data by using data sets collected from a plurality of additive manufacturing machines 209 that operate independently on different sites. In addition, it is also possible to add the additive manufacturing path generation apparatus 200 from which a data set is collected to a target of data set collection in the course of a learning process, or remove the additive manufacturing path generation apparatus 200 from the target on the contrary. Furthermore, the machine learning apparatus 220 that has learned a formation allowable temperature that satisfies the formation accuracy of the result of object formation based on the formation path data for a certain additive manufacturing path generation apparatus 200 may be attached to another additive manufacturing path generation apparatus 200 such that a formation allowable temperature that satisfies the formation accuracy of the result of object formation based on the formation path data may be relearned and updated for the other additive manufacturing path generation apparatus 200.

Furthermore, the machine learning apparatus 220 can be implemented by the hardware illustrated in FIG. 25. The processor 11 reads programs from the memory 12 and executes the programs to operate as the state observation unit 221 and the learning unit 222.

The configurations set forth in the above embodiments show examples, and it is possible to combine the configurations with another known technique or combine the embodiments with each other, and is also possible to partially omit or change the configurations without departing from the scope.

REFERENCE SIGNS LIST 100 object to be formed;
100a first layer;
100b second layer;
101 base;
102 top surface;
200 additive manufacturing path generation apparatus;
201 formation path generation control unit;
202 formation path generation unit;
203 provisional formation path generation unit;
204 subdivided layer formation path generation unit;
205 formation path correction unit;
206 dot formation path conversion unit;
207 formation order determination unit;
208 formation simulation unit;
209 additive manufacturing machine;
210 formation path storage unit;
211 formation result information storage unit;
220 machine learning apparatus;
221 state observation unit;
222 learning unit.

The invention claimed is:

1. An additive manufacturing path generation apparatus comprising:
   formation path generation circuitry to divide an additive manufacturing object into layers that are units of formation of the additive manufacturing object such that a formation height of a bead for each of formation paths that are paths for formation of the layers does not exceed an upper limit and generate the formation paths from layer definition information and a formation path surface, the layer definition information defining division of the additive manufacturing object into the layers, the formation path surface being a surface restricting positions of the formation paths; and
   formation path correction circuitry to correct the formation path such that the formation path corrected at least in part includes a portion where a plurality of the layers before correction are collectively formed, and that the formation height for the formation path corrected falls within a range between the upper limit and a lower limit.

2. The additive manufacturing path generation apparatus according to claim 1, wherein
   formation height information on a bead to be formed on the formation path is added to the formation path, and
   the formation path correction circuitry:
   extracts a part of the formation path having the formation height lower than the lower limit as a collective formation candidate;
   extracts, as a collective formation portion, a portion of the collective formation candidate in which a sum of a formation height of object formation based on the collective formation candidate and a formation height of object formation based on the formation path above and adjacent to the collective formation candidate does not exceed the upper limit;
   updates the formation height information on the extracted collective formation portion with the sum of the formation height of object formation based on the collective formation candidate and the formation height of object formation based on the formation path above and adjacent to the collective formation candidate; and
   deletes a part of the formation path above and adjacent to the collective formation portion from the formation path.

3. The additive manufacturing path generation apparatus according to claim 2, further comprising:
   dot formation path conversion circuitry to set discrete points on the formation path, and generate a formation path by providing the formation path such that the formation path connects the discrete points, wherein the formation paths between the discrete points are equal in length, and the lengths of the formation paths between the discrete points do not exceed a predetermined value.

4. The additive manufacturing path generation apparatus according to claim 3, further comprising:
formation order determination circuitry, wherein
the formation order determination circuitry determines, as next output candidates, formation paths within a range in which there is no upper and lower relationship between layers when the formation paths are taken out in order from the lower to upper layers,
the additive manufacturing path generation apparatus comprises a formation simulator to simulate a shape of a formation object in which a bead based on the formation path is placed on a base on which an additive manufacturing object is to be placed and a heat distribution of the formation object over time, and evaluate movement time based on an inter-formation movement path provided and a maximum temperature of a part of the formation object on which a bead of a formation path is placed,
a movement path from an end point of a most recently output formation path to a starting point of a formation path that is a next output candidate is generated for each of the formation paths of the next output candidates,
movement time is evaluated and acquired by the formation simulator based on the generated movement paths and a predetermined moving speed,
cooling time is calculated by causing the formation simulator to evaluate the maximum temperature of the part of the formation object on which the bead is placed based on a formation path of the output candidate while providing predetermined lapse time to the formation simulator from a state at a time point when the movement time elapses after object formation based on a most recently output formation path, the cooling time being required for the maximum temperature of the part of the formation object on which the bead is placed to decrease to a predetermined formation allowable temperature,
formation waiting time is calculated as a sum of the movement time acquired and the cooling time calculated, the formation waiting time being time that elapses before a start of object formation based on the formation path of the output candidate,
a formation path that minimizes the formation waiting time calculated is selected as a formation path to be output, from among the formation paths of the next output candidates, and
the selected formation path is provided to the formation simulator to update a state of the formation simulator with states of a shape and heat distribution of a formation object formed, and output a movement path and formation waiting time corresponding to the selected formation path and the formation path.

5. The additive manufacturing path generation apparatus according to claim 2, further comprising:
formation order determination circuitry, wherein
the formation order determination circuitry determines, as next output candidates, formation paths within a range in which there is no upper and lower relationship between layers when the formation paths are taken out in order from the lower to upper layers,
the additive manufacturing path generation apparatus comprises a formation simulator to simulate a shape of a formation object in which a bead based on the formation path is placed on a base on which an additive manufacturing object is to be placed and a heat distribution of the formation object over time, and evaluate movement time based on an inter-formation movement path provided and a maximum temperature of a part of the formation object on which a bead of a formation path is placed,
a movement path from an end point of a most recently output formation path to a starting point of a formation path that is a next output candidate is generated for each of the formation paths of the next output candidates,
movement time is evaluated and acquired by the formation simulator based on the generated movement paths and a predetermined moving speed,
cooling time is calculated by causing the formation simulator to evaluate the maximum temperature of the part of the formation object on which the bead is placed based on a formation path of the output candidate while providing predetermined lapse time to the formation simulator from a state at a time point when the movement time elapses after object formation based on a most recently output formation path, the cooling time being required for the maximum temperature of the part of the formation object on which the bead is placed to decrease to a predetermined formation allowable temperature,
formation waiting time is calculated as a sum of the movement time acquired and the cooling time calculated, the formation waiting time being time that elapses before a start of object formation based on the formation path of the output candidate,
a formation path that minimizes the formation waiting time calculated is selected as a formation path to be output, from among the formation paths of the next output candidates, and
the selected formation path is provided to the formation simulator to update a state of the formation simulator with states of a shape and heat distribution of a formation object formed, and output a movement path and formation waiting time corresponding to the selected formation path and the formation path.

6. The additive manufacturing path generation apparatus according to claim 1, wherein
the formation path generation circuitry further includes:
provisional formation path generation circuitry to generate provisional formation paths from the layer definition information and the formation path surface, the provisional formation paths being formation paths that are provisional; and
subdivided layer formation path generation circuitry to select the layer in which a maximum formation height of a bead on the provisional formation path exceeds the upper limit, set a subdivided layer by dividing the selected layer in a height direction such that a maximum formation height of a bead on a formation path of the set subdivided layer does not exceed the upper limit, and generate a formation path of the set subdivided layer to replace the formation path of the selected layer with the generated formation path.

7. The additive manufacturing path generation apparatus according to claim 6, further comprising:
dot formation path conversion circuitry to set discrete points on the formation path, and generate a formation path by providing the formation path such that the formation path connects the discrete points, wherein the formation paths between the discrete points are equal in length, and the lengths of the formation paths between the discrete points do not exceed a predetermined value.

8. The additive manufacturing path generation apparatus according to claim 7, further comprising:
formation order determination circuitry, wherein
the formation order determination circuitry determines, as next output candidates, formation paths within a range in which there is no upper and lower relationship between layers when the formation paths are taken out in order from the lower to upper layers,
the additive manufacturing path generation apparatus comprises a formation simulator to simulate a shape of a formation object in which a bead based on the formation path is placed on a base on which an additive manufacturing object is to be placed and a heat distribution of the formation object over time, and evaluate movement time based on an inter-formation movement path provided and a maximum temperature of a part of the formation object on which a bead of a formation path is placed,
a movement path from an end point of a most recently output formation path to a starting point of a formation path that is a next output candidate is generated for each of the formation paths of the next output candidates,
movement time is evaluated and acquired by the formation simulator based on the generated movement paths and a predetermined moving speed,
cooling time is calculated by causing the formation simulator to evaluate the maximum temperature of the part of the formation object on which the bead is placed based on a formation path of the output candidate while providing predetermined lapse time to the formation simulator from a state at a time point when the movement time elapses after object formation based on a most recently output formation path, the cooling time being required for the maximum temperature of the part of the formation object on which the bead is placed to decrease to a predetermined formation allowable temperature,
formation waiting time is calculated as a sum of the movement time acquired and the cooling time calculated, the formation waiting time being time that elapses before a start of object formation based on the formation path of the output candidate,
a formation path that minimizes the formation waiting time calculated is selected as a formation path to be output, from among the formation paths of the next output candidates, and
the selected formation path is provided to the formation simulator to update a state of the formation simulator with states of a shape and heat distribution of a formation object formed, and output a movement path and formation waiting time corresponding to the selected formation path and the formation path.

9. The additive manufacturing path generation apparatus according to claim 6, further comprising:
formation order determination circuitry, wherein
the formation order determination circuitry determines, as next output candidates, formation paths within a range in which there is no upper and lower relationship between layers when the formation paths are taken out in order from the lower to upper layers,
the additive manufacturing path generation apparatus comprises a formation simulator to simulate a shape of a formation object in which a bead based on the formation path is placed on a base on which an additive manufacturing object is to be placed and a heat distribution of the formation object over time, and evaluate movement time based on an inter-formation movement path provided and a maximum temperature of a part of the formation object on which a bead of a formation path is placed,
a movement path from an end point of a most recently output formation path to a starting point of a formation path that is a next output candidate is generated for each of the formation paths of the next output candidates,
movement time is evaluated and acquired by the formation simulator based on the generated movement paths and a predetermined moving speed,
cooling time is calculated by causing the formation simulator to evaluate the maximum temperature of the part of the formation object on which the bead is placed based on a formation path of the output candidate while providing predetermined lapse time to the formation simulator from a state at a time point when the movement time elapses after object formation based on a most recently output formation path, the cooling time being required for the maximum temperature of the part of the formation object on which the bead is placed to decrease to a predetermined formation allowable temperature,
formation waiting time is calculated as a sum of the movement time acquired and the cooling time calculated, the formation waiting time being time that elapses before a start of object formation based on the formation path of the output candidate,
a formation path that minimizes the formation waiting time calculated is selected as a formation path to be output, from among the formation paths of the next output candidates, and
the selected formation path is provided to the formation simulator to update a state of the formation simulator with states of a shape and heat distribution of a formation object formed, and output a movement path and formation waiting time corresponding to the selected formation path and the formation path.

10. The additive manufacturing path generation apparatus according to claim 1, further comprising:
dot formation path conversion circuitry to set discrete points on the formation path, and generate a formation path by providing the formation path such that the formation path connects the discrete points, wherein
the formation paths between the discrete points are equal in length, and the lengths of the formation paths between the discrete points do not exceed a predetermined value.

11. The additive manufacturing path generation apparatus according to claim 10, further comprising:
formation order determination circuitry, wherein
the formation order determination circuitry determines, as next output candidates, formation paths within a range in which there is no upper and lower relationship between layers when the formation paths are taken out in order from the lower to upper layers,
the additive manufacturing path generation apparatus comprises a formation simulator to simulate a shape of a formation object in which a bead based on the formation path is placed on a base on which an additive manufacturing object is to be placed and a heat distribution of the formation object over time, and evaluate movement time based on an inter-formation movement path provided and a maximum temperature of a part of the formation object on which a bead of a formation path is placed, a movement path from an end point of a most recently output formation path to a starting point of a formation path that is a next output candidate is generated for each of the formation paths of the next output candidates, movement time is evaluated and acquired by the formation simulator based on the generated movement paths and a predetermined moving speed, cooling time is calculated by causing the formation simulator to evaluate the maximum temperature of the part of the formation object on which the bead is placed based on a formation path of the output candidate while providing predetermined lapse time to the formation simulator from a state at a time point when the movement time elapses after object formation based on a most recently output formation path, the cooling time being required for the maximum temperature of the part of the formation object on which the bead is placed to decrease to a predetermined formation allowable temperature, formation waiting time is calculated as a sum of the movement time acquired and the cooling time calculated, the formation waiting time being time that elapses before a start of object formation based on the formation path of the output candidate, a formation path that minimizes the formation waiting time calculated is selected as a formation path to be output, from among the formation paths of the next output candidates, and the selected formation path is provided to the formation simulator to update a state of the formation simulator with states of a shape and heat distribution of a formation object formed, and output a movement path and formation waiting time corresponding to the selected formation path and the formation path.

12. The additive manufacturing path generation apparatus according to claim 1, further comprising:

formation order determination circuitry, wherein the formation order determination circuitry determines, as next output candidates, formation paths within a range in which there is no upper and lower relationship between layers when the formation paths are taken out in order from the lower to upper layers, the additive manufacturing path generation apparatus comprises a formation simulator to simulate a shape of a formation object in which a bead based on the formation path is placed on a base on which an additive manufacturing object is to be placed and a heat distribution of the formation object over time, and evaluate movement time based on an inter-formation movement path provided and a maximum temperature of a part of the formation object on which a bead of a formation path is placed, a movement path from an end point of a most recently output formation path to a starting point of a formation path that is a next output candidate is generated for each of the formation paths of the next output candidates, movement time is evaluated and acquired by the formation simulator based on the generated movement paths and a predetermined moving speed, cooling time is calculated by causing the formation simulator to evaluate the maximum temperature of the part of the formation object on which the bead is placed based on a formation path of the output candidate while providing predetermined lapse time to the formation simulator from a state at a time point when the movement time elapses after object formation based on a most recently output formation path, the cooling time being required for the maximum temperature of the part of the formation object on which the bead is placed to decrease to a predetermined formation allowable temperature, formation waiting time is calculated as a sum of the movement time acquired and the cooling time calculated, the formation waiting time being time that elapses before a start of object formation based on the formation path of the output candidate, a formation path that minimizes the formation waiting time calculated is selected as a formation path to be output, from among the formation paths of the next output candidates, and the selected formation path is provided to the formation simulator to update a state of the formation simulator with states of a shape and heat distribution of a formation object formed, and output a movement path and formation waiting time corresponding to the selected formation path and the formation path.

13. A machine learning apparatus for learning a formation allowable temperature that satisfies processing accuracy of a result of object formation based on the formation path output from the additive manufacturing path generation apparatus according to claim 1, the machine learning apparatus comprising:

state observation circuitry to observe, as state variables, the formation path output from the additive manufacturing path generation apparatus, a build material quality type, and formation accuracy of the result of object formation based on the formation path; and learning circuitry to learn a formation allowable temperature that satisfies the formation accuracy of the result of object formation according to a data set created based on the state variables.

14. An additive manufacturing path generation method comprising:

a formation path generation of dividing an additive manufacturing object into layers that are units of formation of the additive manufacturing object such that a formation height of a bead for each of formation paths that are paths for formation of the layers does not exceed an upper limit and generating the formation paths from layer definition information and a formation path surface, the layer definition information defining division of the additive manufacturing object into the layers, the formation path surface being a surface restricting positions of the formation paths; and a formation path correction of correcting the formation path such that the formation path corrected at least in part includes a portion where a plurality of the layers before correction are collectively formed, and that the formation height for the formation path corrected falls within a range between the upper limit and a lower limit.

* * * * *